United States Patent [19]

Martin

[11] Patent Number: 5,386,288
[45] Date of Patent: Jan. 31, 1995

[54] SPLIT GAIN MULTIMODE RING LASER GYROSCOPE AND METHOD

[75] Inventor: Graham J. Martin, Canoga Park, Calif.

[73] Assignee: Litton Systems, Inc., Beverly Hills, Calif.

[21] Appl. No.: 115,018

[22] Filed: Oct. 28, 1987

[51] Int. Cl.$^6$ ............ G01B 9/02; H01S 3/083
[52] U.S. Cl. ................... 356/350; 372/94
[58] Field of Search ............. 356/350; 372/94

[56] References Cited

U.S. PATENT DOCUMENTS

| | | | |
|---|---|---|---|
| 3,395,270 | 7/1968 | Speller | 235/150.25 |
| 3,411,849 | 11/1968 | Aronowitz | 356/28 |
| 3,503,005 | 3/1970 | Mocker | 331/94.5 |
| 3,697,887 | 10/1972 | Lee et al. | 331/94.5 |
| 3,741,657 | 6/1973 | Andringa | 356/350 |
| 3,826,575 | 7/1974 | Walter, Jr. | 356/350 |
| 3,854,819 | 12/1974 | Andriga | 356/350 |
| 4,108,553 | 8/1978 | Zampeillo et al. | 356/350 |
| 4,123,162 | 10/1978 | Sanders | 356/350 |
| 4,141,651 | 2/1979 | Smith et al. | 356/350 |
| 4,229,106 | 10/1980 | Dorschner | 356/350 |
| 4,247,832 | 1/1981 | Sanders et al. | 331/94.5 |
| 4,267,478 | 5/1981 | Ljung et al. | 310/315 |
| 4,320,974 | 3/1982 | Ljung | 356/350 |
| 4,383,763 | 5/1983 | Hutchings et al. | 356/350 |
| 4,449,824 | 5/1984 | Matthews | 356/350 |
| 4,470,701 | 9/1984 | Smith | 356/350 |
| 4,473,297 | 9/1984 | Simpson et al. | 356/350 |
| 4,482,249 | 11/1984 | Smith, Jr. et al. | 356/350 |
| 4,597,667 | 7/1986 | Curby et al. | 356/350 |
| 4,616,930 | 10/1986 | Martin | 356/350 |
| 4,637,255 | 1/1987 | Martin | 73/517 R |
| 4,687,331 | 8/1987 | Holz et al. | 356/350 |

OTHER PUBLICATIONS

Coccoli, "An Overview of Laser Gyroscopes", Twelfth Joint Services Data Exchange for Inertial Systems, Oct. 1978.

Menegozzi et al., "Theory of a Ring Laser", Physical Review, Oct. 1973, vol. 8, No. 4, pp. 2103–2125.

A. D. White, "Frequency Stabilization Gas Lasers", IEEE, Journal of Quantum Electronics, vol. QE-1, No. 8, Nov. 1965, pp. 349 and 355.

Killpatrick, "The Laser Gyro", IEEE Spectrum, Oct. 1967, pp. 44–55.

Chow et al. "Multioscillator Laser Gyros", IEEE Journal of Quantum Electronics, Sep. 1980, vol. QE-16, No. 9, pp. 918–940.

Chow et al, "The Ring Laser Gyro", Review of Modern Physics, vol. 57, No. 1, Jan. 1985, pp. 61–104.

H. de Lang, "Eigenstates of Polarization in Lasers", Philips Research Reports, Vo. 19, pp. 429–440.

H. de Lang, "Polarization Properties of Optical Resonators, Passive and Active", Philips Research Reports Suppl. No. 8, 1967.

Kaminow, "Balanced Optical Discriminator", *Applied Optics*, Apr. 1964, vol. 3, No. 4, pp. 507–510.

*Primary Examiner*—Stephen C. Buczinski
*Attorney, Agent, or Firm*—Lynn & Lynn

[57] ABSTRACT

A ring laser gyroscope uses a lasing-mode suppression technique to circumvent frequency locking rather than more common frequency biasing methods. The device operates with a four-mirrored nonplanar optical path that allows left and right circularly polarized, on-axis modes to lase in each direction when an included gaseous gain medium is electrically discharged. A uniform axial magnetic field is applied to the gain region in order to produce a splitting of the gain curve into two parts separated in frequency by the cavity free spectral range. By small adjustments to the cavity length the two gain curves are centered about consecutive cavity longitudinal mode sets, each consisting of four modes. Consequently only two modes from each set can lase, thus creating a four-mode ring laser gyroscope with arbitrarily large lasing mode frequency spacings controlled primarily by the cavity geometry. The device may be configured to operate with a single isotope of neon in the gain medium. A simple magnetic field servo mechanism provides a high degree of immunity to external magnetic field charges.

74 Claims, 11 Drawing Sheets

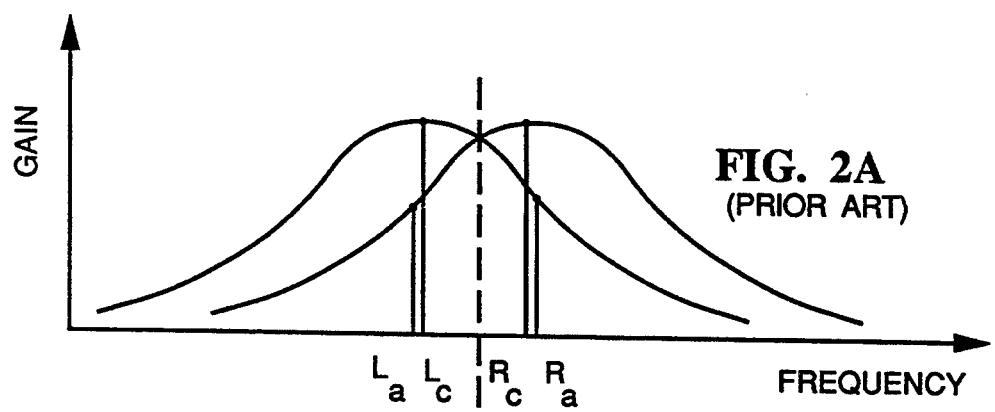
FIG. 2A (PRIOR ART)
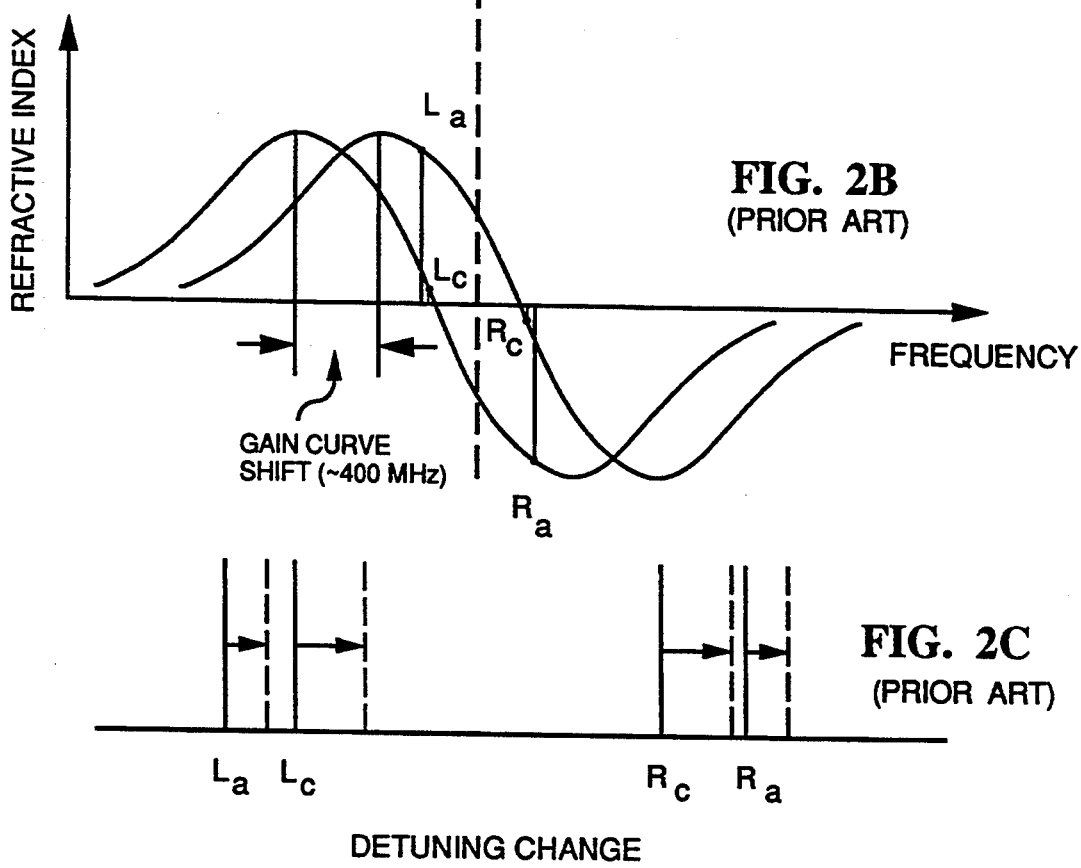
FIG. 2B (PRIOR ART)
FIG. 2C (PRIOR ART)

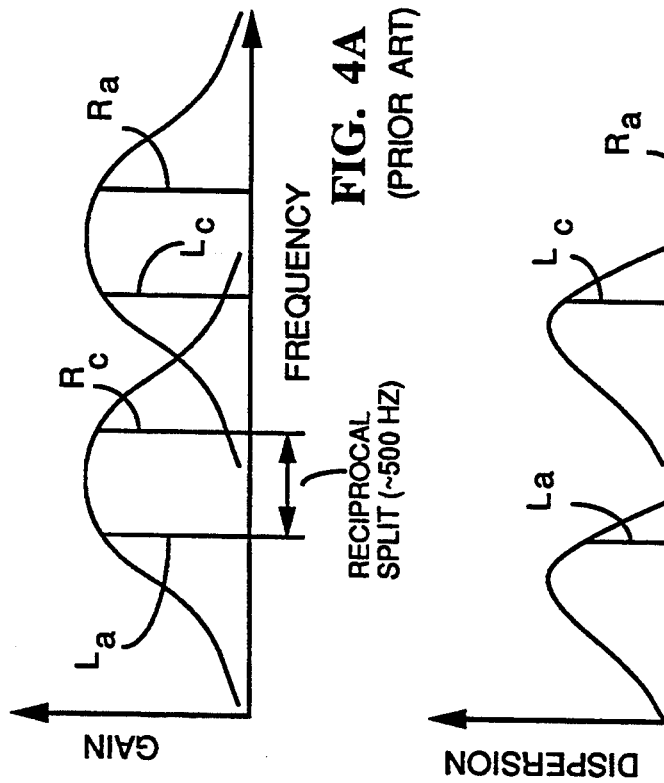
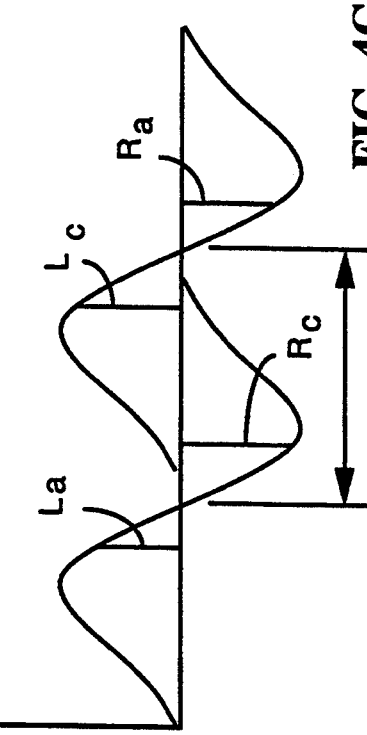
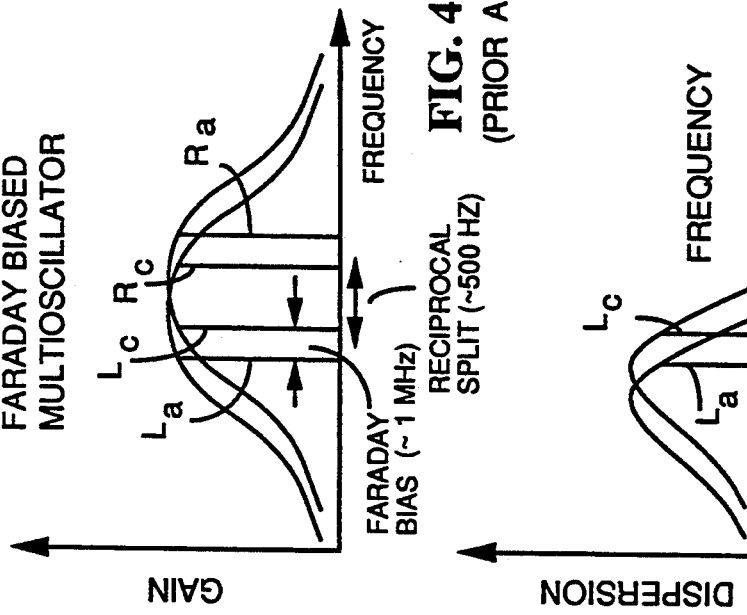
FIG. 4A (PRIOR ART)
FIG. 4B (PRIOR ART)
FIG. 4C (PRIOR ART)
FIG. 4D (PRIOR ART)

SPLIT GAIN MULTIMODE RING LASER GYROSCOPE AND METHOD

BACKGROUND OF THE INVENTION

This invention relates generally to rotation sensors and particularly to ring laser gyroscope rotation sensors. Still more particularly, this invention relates to apparatus and methods for reducing errors in measurements made with ring laser gyroscopes caused by the tendency of the counterpropagating beams of ring laser gyroscopes to lock to a common frequency at low rotation rates.

A ring laser gyroscope employs the Sagnac effect to detect rotation. Two counter propagating light beams in a closed loop will have transit times that differ in direct proportion to the rotation rate of the loop about an axis perpendicular to the plane of the loop. The planar ring laser gyroscope has the simplest type of optical path. However, other path geometries provide advantages over the planar path.

There are in general two basic techniques for utilizing the Sagnac effect to detect rotations. A first technique is the interferometric approach, which involves measuring the differential phase shift between two counterpropagating beams injected from an external source, typically a laser, into a Sagnac ring. The ring may be defined by mirrors or by a coil of optical fiber. Beams exiting the path interfere and create a pattern of light and dark lines that is usually called a fringe pattern. Absolute changes in the fringe pattern are indicative of rotation of the ring. The primary difficulty with such devices is that the changes are very small for rotation rates of interest in guidance applications.

The ring laser gyroscope uses the second technique for utilizing the Sagnac effect to detect rotations. In a ring laser, resonant properties of a closed cavity convert the Sagnac phase difference between the counter propagating beams into a frequency difference, which is more easily measured than the absolute phase shift. Ring laser gyroscopes may be classified as passive or active, depending upon whether the gain medium is external or internal to the cavity. In the active ring laser gyroscope the cavity defined by the closed optical path becomes an oscillator. Output beams from the two directions interfere to give a beat frequency that is a measure of the rotation rate. The oscillator approach has the advantage that the frequency filtering properties of the cavity resonator are narrowed by many orders of magnitude below the passive cavity to give the potential for simple configurations for very precise rotation sensing. To date, the major ring laser gyroscope rotation sensor effort has been put into the active ring laser. Presently all commercially available optical rotation sensors are active ring laser gyroscopes.

A ring laser gyroscope has a sensor axis that passes through the closed path traversed by the counterpropagating beams. For a planar path, the sensor axis is conveniently normal to the path. In an out of plane gyro, the sensor axis may be a line normal to the projection of the path upon a plane. When the ring laser gyroscope is not rotating about its sensor axis, the optical paths for the two counterpropagating beams have identical lengths so that the two beams have identical frequencies. Rotation of the ring laser gyroscope about its sensor axis causes the effective path length for light traveling in the direction of rotation to increase while the effective path length for the wave traveling opposite in direction to the rotation decreases.

When the rotation rate of the ring laser gyroscope is within a certain range, the frequency difference between the beams disappears. This phenomenon is called frequency lock-in, or mode locking, and is a major difficulty with the ring laser gyroscope because at low rotation rates the ring laser gyroscope produces a false indication that the device is not rotating. If the rotation rate of a ring laser gyroscope starts at a value above that where lock-in occurs and is then decreased, the frequency difference between the beams disappears at a certain input rotation rate. This input rotation rate is called the lock-in threshold. The range of rotation rates over which lock-in occurs is generally called the deadband of the ring laser gyroscope.

Lock-in arises from coupling of light between the beams. The coupling results primarily from backscatter off the mirrors that confine the beams to the closed path. Backscatter causes the beam in each direction to include a small component having the frequency of the beam propagating in the other direction. The lock-in effect in a ring laser gyroscope is similar to the coupling that has been long been observed and understood in conventional electronic oscillators.

In addition to causing erroneous rotation rate information to be output from a ring laser gyroscope, lock-in causes standing waves to appear on the mirror surfaces. These standing waves may create a grating of high and low absorption regions, which creates localized losses that increase the coupling and the lock-in. The mirrors may be permanently damaged by leaving a ring laser gyroscope operating in a lock-in condition.

Any inability to accurately measure low rotation rates reduces the effectiveness of a ring laser gyroscope in navigational systems. Therefore it is well known that a ring laser gyroscope requires means for circumventing mode locking.

There are several known attempts to solve the problems of lock-in. Currently the primary method for reducing the effects of mode locking involves mechanically oscillating the ring laser gyroscope about its sensor axis so that the device is constantly sweeping through the deadband and is never locked therein. This mechanical oscillation of the ring laser gyroscope is usually called dithering. A typical ring laser gyroscope may be dithered at about 400 Hz with an angular displacement of a few arc minutes. Although this method has proven effective in some guidance applications, there are disadvantages associated with mechanical dithering. Dither suspension and drive mechanisms are mechanically complex, and fail to completely eliminate the effects of residual backscatter coupling. Some guidance applications cannot tolerate the amount of mechanical vibration required to mechanically dither the ring laser gyroscope frame.

Mirror dither is another approach that has been investigated in attempts to reduce the effects of lock-in. One or more of the mirrors that define the optical path may be oscillated at a very small amplitude. The Doppler effect causes a difference between the frequency of backscattered light and forward reflected light. Transverse dithering of all four mirrors of a rectangular gyro shifts only the frequency of the backscattered beam. However, transverse mirror dither is difficult to implement because of the large amount of energy required to move mirrors that are mounted to the gyro body. Longitudinal mirror dither is easier to implement, but it shifts the frequencies of both the forward and backscattered light. Therefore, the analysis of signals in a longitudinally mirror dithered gyro is complicated.

Multioscillator ring laser gyroscopes have also been proposed to overcome the effects of mode locking. The term "multioscillator" refers to the four modes of electromagnetic energy that propagate simultaneously in the cavity as opposed to the usual pair counterpropagating linearly polarized modes that exist in the conventional two mode gyro. Multioscillator ring laser gyroscopes are described in U.S. Pat. No. 3,862,803 to Yntema, Warner and Grant and U.S. Pat. No. 3,741,657 to Andringa.

The basic multioscillator ring laser gyroscope operates with left circularly polararized (LCP) and right circularly polarized (RCP) light beams and uses a Faraday effect glass device within the cavity or a magnetic field on the gain plasma to provide a phase shift between the counterpropagating waves to prevent mode locking. Reflections from the intracavity element and instabilities in the magnetic field cause difficulties that have yet to be overcome in attempts to build a navigation grade multioscillator ring laser gyroscope.

In order for the multioscillator ring laser gyroscope configuration to operate, the cavity must include means for separating the operating frequencies of the LCP and the RCP gyroscopes. This separation is the reciprocal bias, which is in addition to the non-reciprocal bias that operates between modes propagating in opposite directions. Early multioscillator ring laser gyroscopes used an intracavity optically active crystalline element to provide the reciprocal splitting. Later Dorschner et al. disclosed in U.S. Pat. No. 4,482,249 an out-of-plane light path that provided the required reciprocal splitting without using an intracavity element. The amount of reciprocal splitting is easily controlled by changing the amount of nonplanarity. However, the multioscillator ring laser gyroscope disclosed by Dorschner et al. still required an intracavity element to create the nonreciprocal biasing.

Intracavity elements are undesirable for many reasons. Apart from causing additional complexity in the manufacture and assembly, intracavity elements contribute to cavity losses and to backscatter. The cavity losses increase random walk, and the backscatter causes scale factor errors. Intracavity elements also are a source of thermal drift effects, etaloning within the cavity and long term drifts since element stress and position within the cavity change with age. There are also concerns regarding the effects of nuclear radiation on such elements.

Both Dorschner in U.S. Pat. No. 4,229,106 and Sanders in U.S. Pat. No. 4,231,705 have suggested the removal of the intracavity element by using the Verdet constant of the gas gain plasma itself as a source for a non-reciprocal bias. The anomalous dispersion of the gain medium at the lasing frequency and the additional length of the plasma region over any possible intracavity element can mean that comparable bias shifts are obtainable. However, the Verdet constant is in effect proportional to the overall cavity loss and can be considerably reduced for low-loss cavities. This configuration involves the application of an axial magnetic field of typically about 100 gauss to the gain plasma and is sometimes referred to in the literature as a ZEELAG device (ZEEman LAser Gyro). This ZEELAG configuration proved to be unsuccessful as an accurate laser gyroscope because of large sensitivities of the bias to both changes in the cavity length (detuning) and in temperature. The primary origin of these effects is directly related to cavity detuning. Because the LCP and RCP gyros must operate at greatly different points on their respective dispersion curves, there is a large differential change in their Verdet constants as the cavity detuning is changed. Therefore, the nonreciprocal bias magnitude for the two gyros do not track each other closely enough to provide high accuracy operation as a rotation sensor. Temperature variations also cause differential changes in the shape of the dispersion curves and produce errors.

Since the shortcomings of the ZEELAG configuration have been demonstrated, efforts on the multioscillator ring laser gyroscope have avoided the use of large axial magnetic fields on the gain plasma and have concentrated on minimizing the error created by the intracavity glass element positioned in a large (~kilogauss) axial field such as disclosed in U.S. Pat. No. 4,548,501 by Dorschner et al.

Small axial fields of less than one gauss have been suggested for use on the gain plasma with the purpose of compensating for the differential dispersion created by the non-reciprocal bias. Such methods are described in U.S. Pat. No. 3,973,385 to Ferrar and in U.S. Pat. No. 4,470,701 to Smith.

U.S. Pat. No. 928,069 by the present inventor discloses a ring laser gyroscope in which an axial magnetic field is applied to the gain region in order to suppress two of the four modes that would normally lase in a nonplanar four-mirrored clear path cavity with circularly polarized modes. The disclosure of that application is hereby incorporated by reference into the present disclosure. This arrangement creates a configuration that relies on the reciprocal splitting produced by a nonplanar cavity to provide a bias between the two remaining modes in the cavity. This two mode device has the drawback of depending on the stability of the reciprocal splitting produced by the nonplanar geometry. This frequency difference is subject to changes in the cavity mirror phase retardation, which is induced by temperature changes and plasma damage effects. Geometry changes such as those induced by mirror tilt when the diaphragm mirrors are moved, as described in U.S. Pat. No. 4,383,763 to Hutchings to provide cavity length control, also affect the frequency difference.

SUMMARY OF THE INVENTION

The present invention provides apparatus and methods for producing a clear path, undithered multioscillator ring laser. The present invention overcomes the problems of previous multioscillator ring lasers to a large degree by using common-mode rejection between two gyro pairs operating in the same cavity.

The present invention is a new class of ring laser gyroscope. The stability problems normally associated with ring laser gyroscopes are greatly minimized by allowing four modes to lase within the cavity to, in effect, create two gyro beam pairs. One of these beam pairs is left circularly polarized (LCP) and the other is right circularly polarized (RCP). The lasing modes in a four mode ring laser gyroscope are configured so that a pair of two component gyros simultaneously exist within the cavity. The sum of the beat outputs provides a signal that is doubly sensitive to input rotation and also substantially insensitive to changes in bias.

The present invention provides what is in effect a non-reciprocal gyro bias in a four mode laser gyro with the use of a large axial magnetic field without incurring any of the disadvantages of the previous ZEELAG design. Furthermore, the ring laser according to present invention not only is a clear path device, but it also has such a large bias that backscatter effects become secondary. The present invention can be configured to operate with substantially only one isotope of neon. In addition, the present invention can operate with a simple field servo system that makes the device insensitive to large external field variations.

The multioscillator ring laser gyroscope according to the invention comprises a clear path Sagnac ring rotation sensor including a resonant cavity that defines a closed optical path and a gain medium therein. The invention includes means for producing multioscillator lasing modes in the cavity such that the gain medium provides a corresponding gain curve for each lasing mode. The invention further includes means for adjusting the gain medium to produce a frequency shift between selected gain curve centers. The frequency shift between the gain curve centers suppresses the lasing action of selected modes in the cavity to prevent frequency locking. The actual lasing frequencies of the cavity modes are not substantially changed by this shift of the gain curve centers.

The Sagnac ring rotation sensor of the present invention may also include means for separating the lasing frequencies of lasing modes of different polarization. The lasing frequencies of modes that are above threshold in the cavity may be separated by application of an axially directed magnetic field to the gain medium as a result of selected mode suppression. The invention further includes means for adjusting the axial magnetic field to a magnitude that produces a splitting between the gain curve for anticlockwise left circularly polarized light and clockwise right circularly polarized light and the gain curve for clockwise left circularly polarized light and anticlockwise right circularly polarized light that is substantially equal in frequency to a multiple of the free spectral range of the cavity.

The method of the invention for sensing rotations with a Sagnac ring rotation sensor that includes a resonant cavity that defines a closed optical path and a gain medium therein comprises the steps of producing multioscillator lasing modes in the cavity, providing a corresponding gain curve for each lasing mode in the gain medium, and adjusting the gain medium to produce a frequency shift between selected gain curves. The method includes the step of suppressing the lasing action of selected modes in the cavity by shifting the frequency of the gain curve centers to prevent frequency locking.

The method of the invention includes the step of separating the lasing frequencies of lasing modes of different polarization. Adjusting the gain medium to produce a frequency shift between selected gain curves includes the step of applying an axially directed magnetic field to the gain medium. The method further includes the step of adjusting the axial magnetic field to a magnitude that produces a splitting between the gain curve for anticlockwise left circularly polarized light and clockwise right circularly polarized light and the gain curve for clockwise left circularly polarized light and anticlockwise right circularly polarized light that is substantially equal in frequency to a multiple of the free spectral range of the cavity.

The method preferably includes the step of tuning the cavity length to a length where a first part of the gain curve of a selected mode is centered about a first longitudinal cavity mode set and a second part of the gain curve is centered about a second longitudinal mode set different from the first longitudinal mode set.

BRIEF DESCRIPTION OF THE DRAWINGS

FIG. 2A–2C illustrate gain and dispersion curves and frequency splitting for a Zeeman ring laser gyroscope;

FIGS. 4A–4D show comparisons of the dispersion for multioscillator and split gain gyros;

DESCRIPTION OF THE PREFERRED EMBODIMENT

Figure 14:
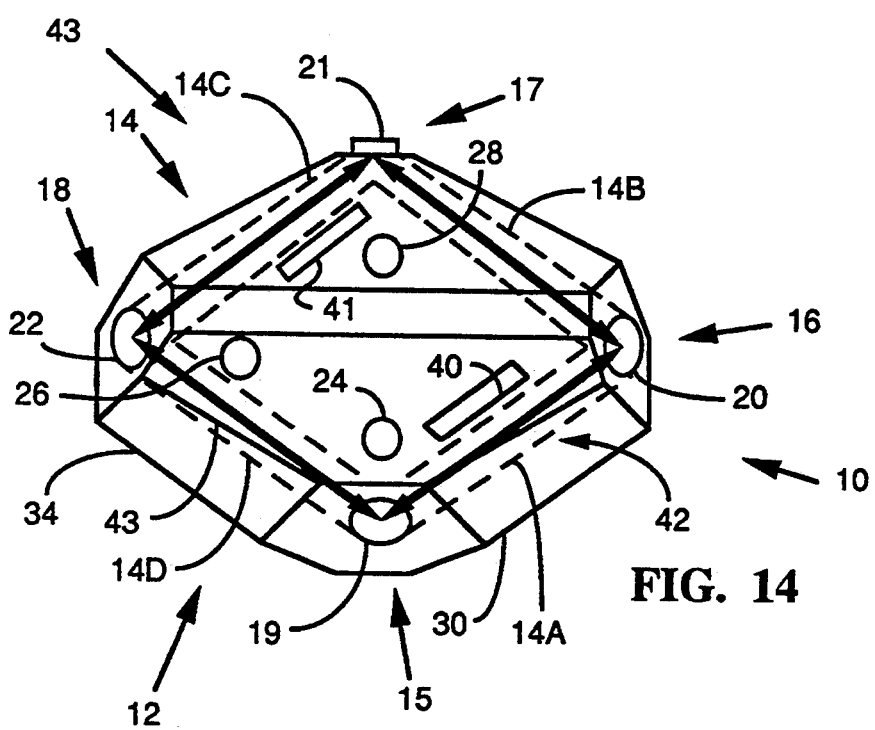
FIG. 14 is a perspective view of a ring laser gyroscope according to the invention.

Referring to FIG. 14, a split gain ring laser gyroscope 10 according to the present invention includes a frame 12 that is preferably formed of a material having very small dimensional changes over a temperature range of about −50° F. to +240° F. Schott glass works of West Germany sells a suitable frame material under the trademark ZERODUR. Owens Illinois sells a suitable frame material under the trademark CERVIT. Both materials are mixtures of glass and ceramic that have opposite temperature expansion coefficients, thus providing overall minimal dimension changes over a wide range of temperatures.

A cavity 14 is formed in the frame 12. The cavity 14 has four corners 15–18 at which mirrors 19–22, respectively, are mounted to the frame 12. The cavity 14 is preferably nonplanar and may be formed as a skewed rhombic quadrilateral, which may be visualized as a rhombus that has been folded along a diagonal. This is one of many possible configurations for the cavity 14 and is described herein for the purpose of explaining the invention. The present invention may be practiced with any out of plane light path in which the beams may circulate. In particular, the cavity may be formed as a square that is folded along a diagonal.

The cavity 14 may comprise a plurality of bores 14A, 14B, etc. to form a path for counterpropagating light beams in the frame 12 between the mirrors 19-22. The frame 12 is generally formed as a solid piece of Zerodur, and the bores 14A-14D are formed by machining. In FIG. 14 the arrows in the cavity 14 represent the counterpropagating beams. The bores are evacuated and then filled with a gas such as a mixture of helium and neon. This mixture is the gain medium of the laser. A pair of anodes 24 and 26 and a cathode 28 are mounted to the frame 12 in contact with the gain medium so that application of a suitable electrical potential difference between the cathode 28 and each of the anodes 24 and 26 produces an electrical discharge in the bores 14A and 14C. Alternately, a radio frequency discharge described subsequently with reference to FIG. 15 may be used to excite the gain medium.

Figure 8:
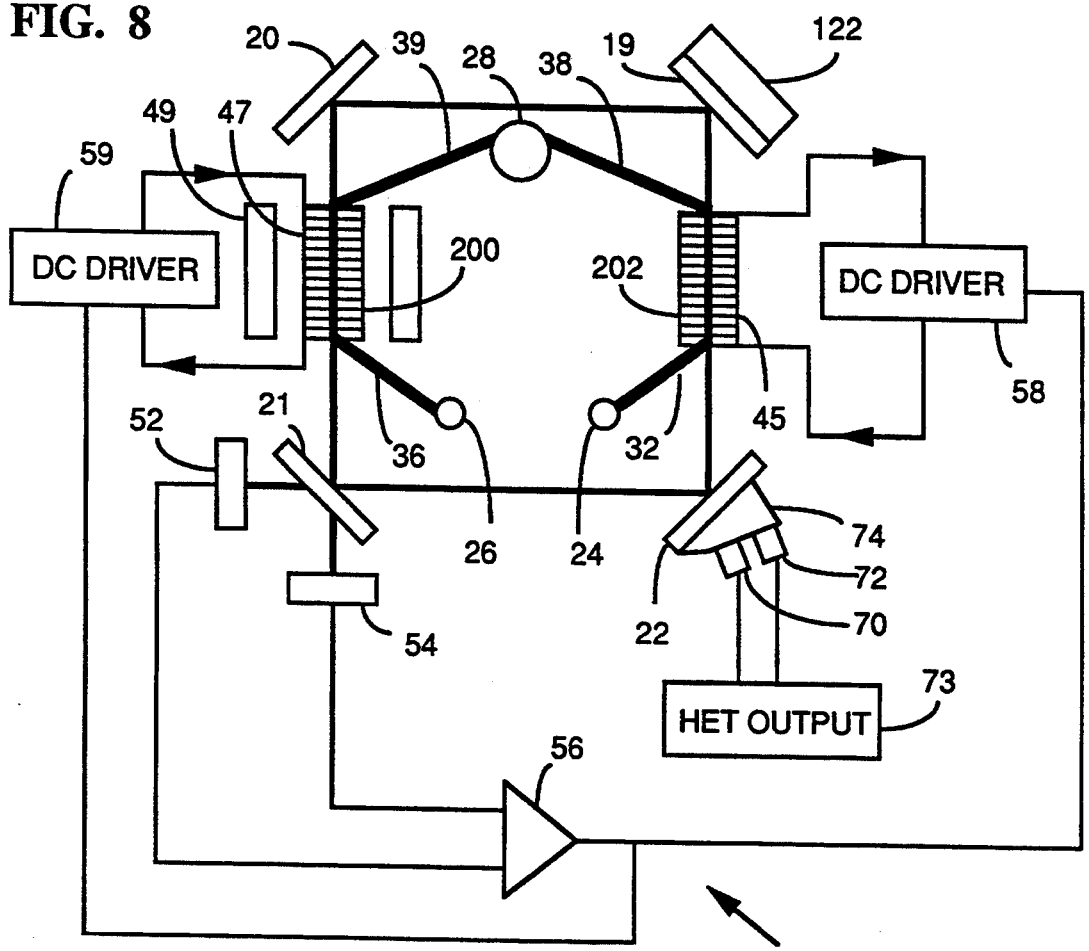
FIG. 8 illustrates a multioscillator ring laser gyroscope according to the invention and a block diagram of a magnetic field servo control circuit that may be included in the present invention.

The anode 24 may be mounted to a surface 30 of the frame 12, and a passage 32, shown in FIG. 8, extends between the anode 24 and the bore 14A. The anode 26 may be mounted to a surface of the frame 12, and a passage 36 extends between the anode 26 and the bore 14C. The cathode 28 may be mounted in the central portion of the frame 12. A passage 38 extends between the cathode 28 and the bores 14A and 14D, respectively. Other arrangements of the anodes and cathodes are possible. The particular arrangements shown and described herein are exemplary only and do not limit the scope of the invention.

When an appropriate potential difference is applied between cathode 28 and the anodes 24 and 26, electrical discharges occur in the bores 14A and 14C. This electrical discharge forms a plasma in cavity 14 by exciting the helium and neon atoms. Collisions with electrons excite helium atoms, which then collide with some of the neon atoms. The most probable result of collisions between the excited helium atoms and the neon atoms is a transfer of energy from the helium to the neon atoms to excite them to an unstable energy state. Electrons in the plasma also may collide with neon atoms and excite them to the same energy unstable state, but the helium atoms are the primary excitation source for raising the neon atoms to the desired energy level. The excited neon atoms return to their ground states by emitting photons. There is a spectrum of photon frequencies that may be produced when the neon atoms return to their ground state. The length of the cavity 14 between the mirrors 19-22 allows only select wavelengths to resonate within the cavity.

The present invention uses circularly polarized light within the gain medium. In the ideal case for perfect mirrors (which produce a phase shift of $\pi$ radians between S and P linearly polarized modes), upon reflection from the mirror 17, for example, a right circularly polarized (RCP) wave will experience a change to left circular polarization (LCP). In order to maintain the lasing action to produce the desired modes and avoid the use of intracavity polarizers, the beams must reflect from an even number of mirrors. Both RCP and LCP waves will lase in the cavity for both the clockwise beam and the anticlockwise beam. Therefore, four different waves associated with each longitudinal cavity mode may propagate in the cavity 14. These four waves may be conveniently identified:

$L_a$ is the anticlockwise left circularly polarized wave;
$L_c$ is the clockwise left circularly polarized wave;
$R_a$ is the anticlockwise right circularly polarized wave; and
$R_c$ is the clockwise right circularly polarized wave.

The longitudinal mode spacing of the beams may be about 1 GHz. The length of the cavity is an integer multiple of the wavelengths that resonate. If the cavity length is L, then $N_1\lambda_1=L$, where $N_1$ is an integer and $\lambda_1$ is the wavelength. The reciprocal of the wavelength is $$\frac{1}{\lambda_1} = \frac{N_1}{L}.$$

The corresponding frequency is $$f_1 = \frac{c}{\lambda_1}.$$

Therefore, the frequency is $$f_1 = \frac{cN_1}{L}.$$

If the frequency $f_1$ lases because the cavity length is an integer number of wavelengths, then the frequency $f_2$ corresponding to $(N_1+1)\lambda_2$ may also lase. This second frequency may be expressed as $$f_2 = \frac{c(N_1 + 1)}{L}.$$

The difference in the two adjacent lasing frequencies is the mode spacing, which is $$f_2 - f_1 = \frac{c}{L}.$$

A mode spacing of 1 GHz corresponds to a cavity length of about 30 cm.

Referring again to FIG. 14, a passage 40 is formed through the frame 12 adjacent the bore 14A. A passage 41 similar to the passage 40 is formed in the frame 12 around the bore 14C. The passages 40 and 41 may be formed by drilling through the frame 12. Desired shapes of the frame portions 42 and 43 around the bores 14A and 14D, respectively, are achieved by further machining the frame 12. The frame portions 42 and 43 are preferably cylindrical or nearly cylindrical; however they may have a plurality of flat surfaces. The invention is not limited to any particular cross section of the frame portions 42 and 43.

FIG. 8 schematically illustrates a possible structure for the present invention. As shown in FIG. 8, a portion of the desired magnetic flux on the gain medium in the bore 14A is provided by connecting a coil 45 formed around a portion of the gain medium to a field servo circuit 50. The servo circuit 50 includes a pair of photodetectors 52 and 54, an error amplifier 56 and DC drivers 58 and 59. The mirror 21 is partially transmissive so that part of each beam incident on it passes to the detectors 52 and 54, respectively. The detectors 52 and 54 produce electrical signals indicative of the optical intensity thereon. An error amplifier 56 produces a signal indicative of the difference between the signals from the two detectors 52 and 54. This differential intensity signal is then input to a DC driver circuit 58 that supplies electric current to the coil 45. Provision is made for an offset to be supplied to the error amplifier 56.

Figure 10:
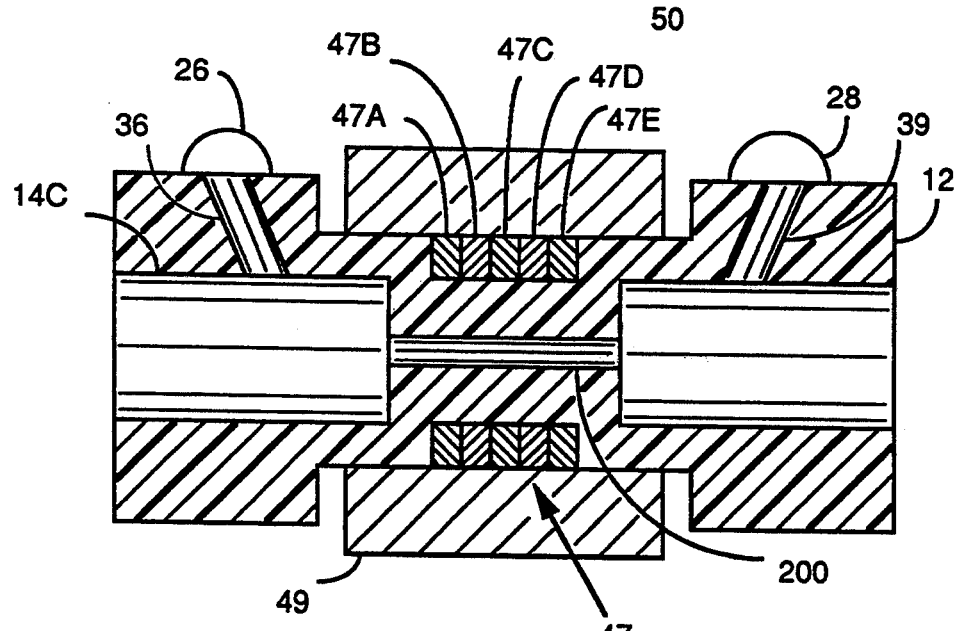
FIG. 10 is a cross sectional view of an arrangement of magnets that may be used to bias the split gain ring laser gyroscope of FIG. 8.

Referring still to FIG. 8, a coil 47 is formed around part of the bore 14C. A cylindrical permanent magnet 49 is also preferably placed around the coil 47. A cross section of a layout for the magnet and gain bore is shown in FIG. 10. The gain is provided by the plasma in the narrow bore section 200. Remaining bore sections containing plasma are wide to substantially reduce gain for reasons that will be made apparent later. The primary axial field is provided by the cylindrical permanent magnet 49. Placing the cylindrical magnet 49 around the gain bore section 200 requires that the magnet 49 be formed of at least two segments (not shown) that are placed together to completely enclose that part of the gain bore.

Figure 17:
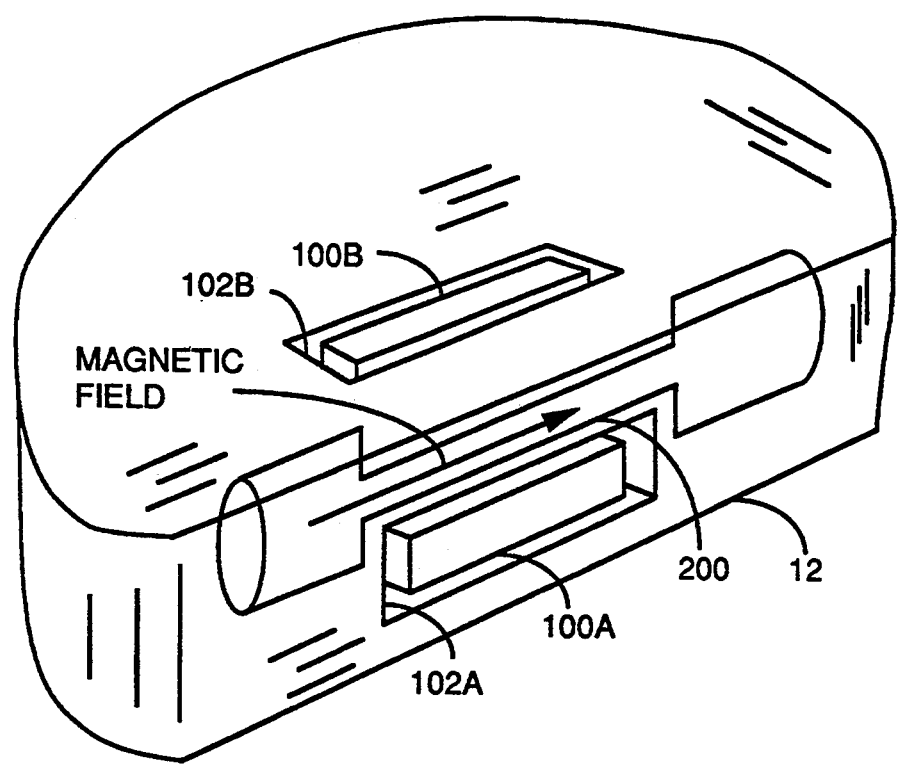
FIG. 17 shows a pair of bar magnets mounted in slots in the frame of a ring laser for biasing the gain medium.

A set of bar magnets 100A, 100B, etc., shown in FIG. 17 could also be used to provide the primary field. FIG. 17 shows one possible arrangement of the bar magnets 100. A plurality of bar magnets are mounted in slots 102A, 102B in the frame 12 so that the fields of the bar magnets 100 are additive in the gain bore section 200. Any desired number of bar magnets may be mounted in the frame to provide the desired field. The bar magnet arrangement may have the advantage of minimizing machining of the glass frame since the bar magnets fit in slots 102 in the frame rather than in a cutout encompassing the gain bore.

The field windings of the coil 47 between the gain bore 200 and the permanent magnet 49 are for making corrections to the magnitude of the axial field as dictated by the field servo system 50 of FIG. 8. The error amplifier provides signals to the DC driver 59 that provides electric current to the coil 47. For a bar magnet system such windings could be wound around the outside of the bars. These field windings may be either wound nonuniformly to have more windings at the ends or may be made up of several segments 47A, 47B etc. as shown in FIG. 10 if a particularly uniform axial field is required. Passing different currents through the various segments minimizes any nonuniformities in the axial fields. The field servo system as described could operate using only one of the sets of field windings 45 and 47 shown in FIG. 8.

Referring to FIGS. 8 and 10, the gain regions of the split gain gyro 10 therefore lie in axial magnetic fields. The preferred configuration has the plasma regions 200 and 202 of FIG. 8 exposed to two different field magnitudes for single isotope operation as explained in detail subsequently. These axial magnetic fields depend on the free spectral range of the cavity and typically have an average value of about 400 gauss. The axial fields are not used to create a Faraday bias as in the ZEELAG gyro, but instead are used to effectively suppress the lasing action of two of the four gyro modes in each longitudinal mode set.

Figure 1:
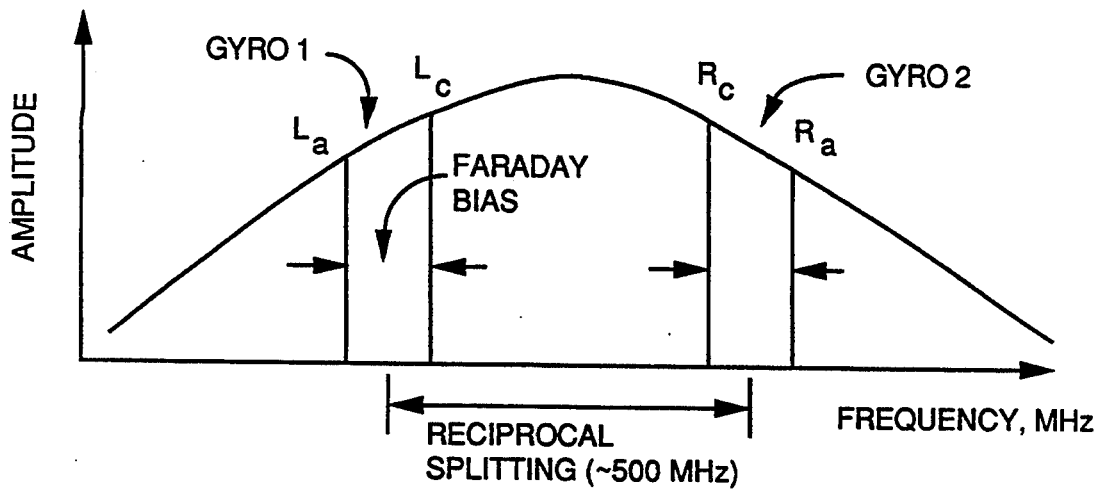
FIG. 1 is a gain curve for the four modes of electromagnetic energy that propagate within the cavity of a conventional multioscillator ring laser gyroscope.

FIG. 1 shows the mode structure of a conventional ring laser gyroscope that uses an intracavity Faraday element for biasing the counterpropagating gyro modes. The curve represents the gain of the cavity as a function of frequency. The system may be regarded as including a first gyro and a second gyro. The lines labelled $L_a$ and $L_c$ are the left circularly polarized anti-clockwise and clockwise waves that correspond to gyro 1. The lines labelled $R_a$ and $R_c$ are the right circularly polarized clockwise and counterclockwise waves that correspond to gyro 2. The frequency difference between the pairs of waves that comprise each gyro is about 1 MHz due to the Faraday bias applied to an intracavity glass element. The reciprocal splitting between the average of the waves for the two gyros is typically about 500 MHz. This is in contrast to the mode spacings of the present invention shown in FIG. 4A.

Figure 3:
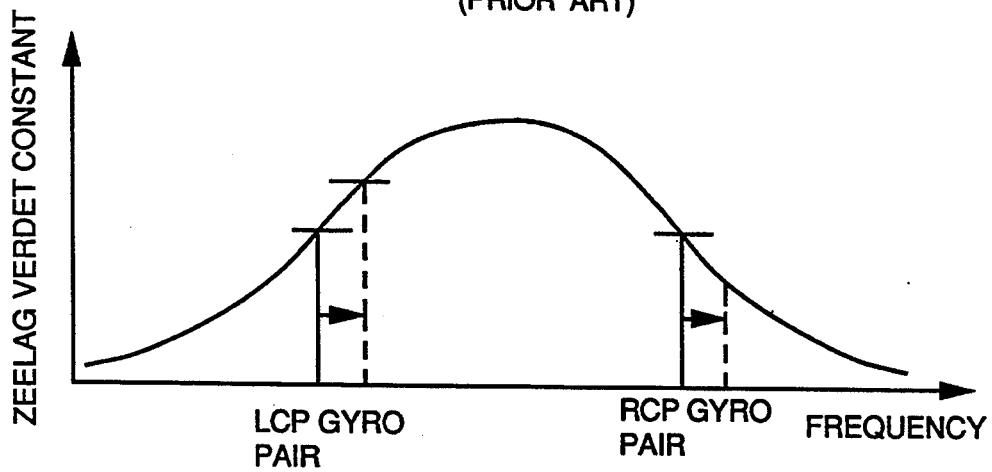
FIG. 3 illustrates the Verdet constant as a function of frequency for a Zeeman ring laser gyroscope.

The mode positions on the dispersion curves for a ZEELAG device are shown in FIG. 2. The ZEELAG configuration proved to be unsuccessful as an accurate laser gyroscope because of large bias sensitivities to changes in the cavity length (detuning) and in temperature. The primary origin of these effects is shown in FIG. 3, which shows plots of the effective Verdet constant of the gain plasma as a function of frequency, which is directly related to cavity detuning. FIG. 3 also shows the relative operating positions for the LCP and RCP gyros. The operating positions of the LCP and RCP gyros are so far apart that there is a large differential change in their Verdet constants as the cavity detuning is changed.

The split gain ring laser gyroscope 10 of FIG. 14 according to the present invention provides effective non-reciprocal gyro bias in a four mode laser gyro with the use of a large axial magnetic field but without any of the disadvantages of the previous ZEELAG design. Furthermore, the present invention is not only a clear path device but also has such a large bias that backscatter effects become secondary. In addition, the present invention can be configured to operate with essentially only one isotope of neon. The present invention has the additional advantage of being operable with a simple field servo system 50 that makes the device insensitive to large external field variations.

The out-of-plane cavity in the split gain ring laser gyroscope provides a reciprocal splitting that is preferably of the order of 100 MHz. However, the invention is not restricted to this preferred value of splitting. As shown in FIG. 8, the gain plasma regions lie in axial magnetic fields. When a DC discharge is used to excite the gain medium, the preferred configuration applies two different field magnitudes to the plasma regions for single isotope operation as will be elaborated upon subsequently. The average axial magnetic field, which is matched to the free spectral range of the cavity, is typically about 400 gauss and is not used to create a Faraday bias as in the ZEELAG gyro. Instead, the magnetic fields are used to effectively suppress the lasing action of two of the four modes at one longitudinal mode position and allow two equivalent modes to lase at the next longitudinal mode position. In this manner the magnetic field has effectively used the free spectral range of the gyro cavity as a non-reciprocal bias for the multioscillator. The symmetry properties of circularly polarized modes in a magnetic field assure that the "bias" is in effect non-reciprocal. The mode positions on the gain and dispersion curves are shown in FIG. 4 and are compared in rough scale to typical mode spacings in the conventional multioscillator. It should be noted that in the split gain gyro 10, since the $L_a$ and $R_a$ modes operate at exactly the same relative position on their dispersion curves as the $L_c$ and $R_c$ modes, respectively, as shown in FIG. 4C, there is substantially zero Faraday bias between the modes. The absence of a Faraday bias between the modes in the present invention is in sharp contrast to the ZEELAG mode configuration shown in FIG. 2B.

Figure 5:
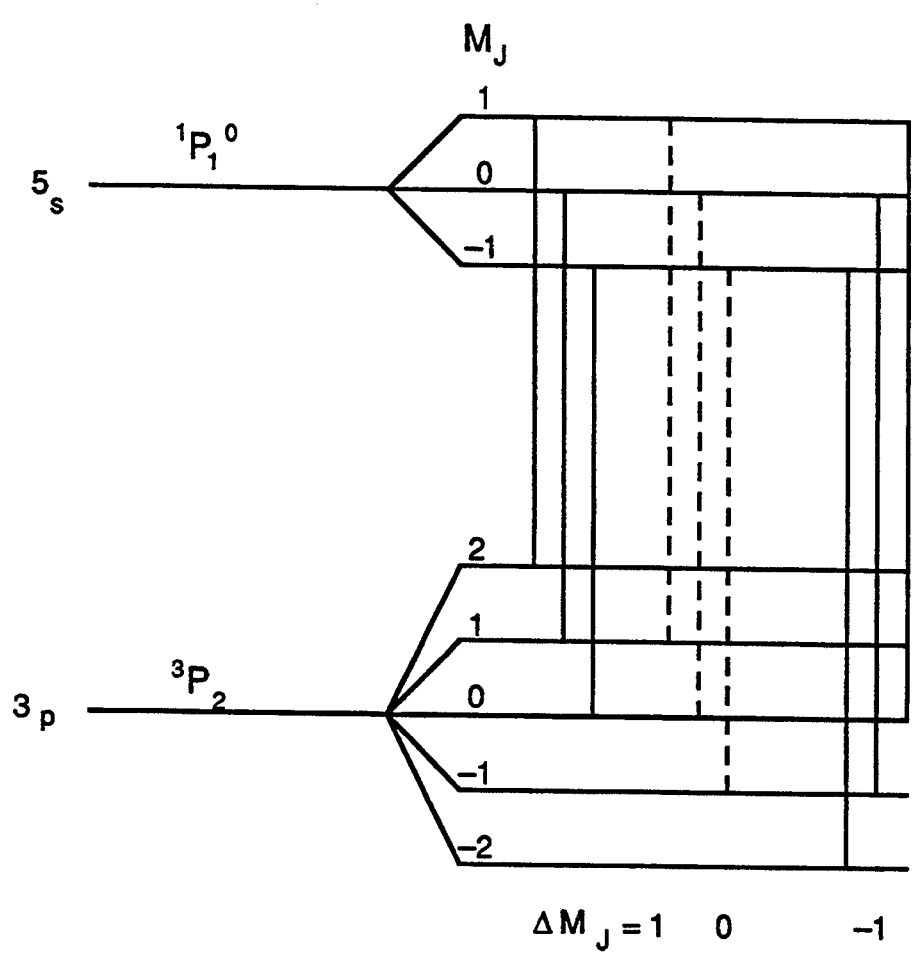
FIG. 5 shows approximate energy levels involved in the 632.8 nm transition of neon.

When an axial magnetic field is applied to the helium-neon gain medium in a ring laser, the upper and lower lasing levels split according to their magnetic quantum numbers $M_J$. The specific splitting for neon is shown in FIG. 5 according to the Russell-Saunders or LS coupling scheme, which can be used to describe the energy levels of neon to a reasonable degree of accuracy. Transitions between the sublevels within the upper and lower lasing levels occur such that the change in magnetic quantum number can be either +1 or 0. The eigenmodes of a nonplanar cavity are substantially circularly polarized and therefore receive gain only from transitions having $\Delta M_J = \pm 1$. As shown in FIG. 5, the $\Delta M_J = -1$ transitions that drive, for example, RCP light release more energy than the $\Delta M_J = +1$ transitions that drive LCP light. Thus the gain curve center for RCP light occurs as higher frequency than that for LCP light. This is the cause of the dispersion curve separation in FIGS. 2 and 4. The size of the splitting is proportional to the magnitude of the applied axial field. The frequency splitting between gain curves is $2g_L\mu_B H/h$ where $g_L$ is the Lande g factor, or gyromagnetic ratio, (1.298 in this case) for the transition, $\mu_B$ is the Bohr magneton, H is the magnetic field and h is Planck's constant. Thus the splitting is about 3.63 MHz per gauss for the 632.8 nm line in the helium-neon laser.

Satisfactory operation of the split gain gyro 10 requires that the mode-pairs $L_a$, $R_c$ and $L_c$, $R_a$ of FIG. 4A should be symmetrically placed about their respective gain curves. This symmetrical placement is achieved by first adjusting the applied-axial fields so that the overall gain curve separation is equal to the cavity free spectral range and second by appropriately adjusting the cavity detuning. In the case of the applied fields being perfectly uniform, the adjustment to the cavity detuning is non-critical. An additional requirement is that the gain levels within the cavity are set low enough that the unwanted modes remain suppressed, a condition that is easy to achieve in practice for virtually all practical cavity lengths.

The desired gain curve splitting for operation of the split gain gyro 10 can be achieved by application of a single axial field of constant magnitude over all sections of the gain plasma within the cavity. However, mode competition considerations between the $L_a$ and $R_c$ modes and the $L_c$ and $R_a$ modes analogous to those effects well known in other types of ring laser gyroscopes require that a dual isotope mixture (such as half $Ne^{20}$ and half $Ne^{22}$) be used as the fill gas in the cavity.

The split gain gyro 10 configuration can circumvent the need for this mix of isotopes and allow the use of a single isotope or natural neon (91% $Ne^{20}$) without any detrimental mode competition effects. The mode competition effects can be avoided by applying two magnetic fields of different magnitude to two parts of the gain plasma. If a DC discharge is used to excite the gain medium, then in order to overcome the usual Fresnel-Fizeau phase shifts associated with gas flow effects in the split gain gyro, a dual anode-single cathode configuration (or vice versa) is preferable as is well known in the art. This anode-cathode configuration naturally divides the plasma into two sections, and so in practice the application of two different magnetic fields to the plasma adds little extra complexity to a DC discharge design.

Figure 6:
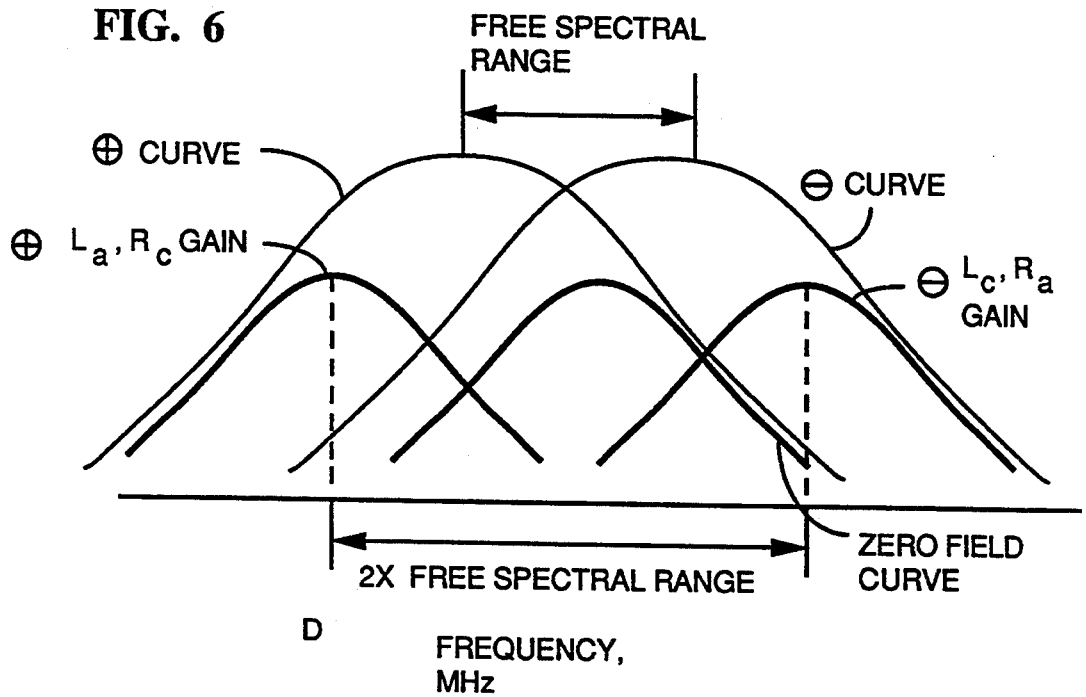
FIG. 6 is one possible gain curve set for a ring laser gyroscope according to the present invention.

The two axial fields duplicate the effects of using a dual isotope mix and produce gain curves as shown in FIG. 6. It is possible to make one of the fields equal to zero (as is the case in FIG. 6), which further simplifies construction of the split gain gyro 10. The advantages of using the two fields are that the fields may be chosen in magnitude to minimize gyro sensitivities to detuning, temperature, gain and field effects. The relative plasma lengths exposed to the fields may be adjusted if necessary to further control the sensitivity of the split gain gyro 10.

The two contributions to each gain curve have the same Doppler width, unlike a dual isotope mix where the widths differ by the ratio $$\sqrt{\frac{20}{22}}.$$

The split gain gyro 10 therefore tends to further minimize temperature sensitivities. It is possible to operate the split gain gyro 10 with a natural mix of neon (9% $Ne^{22}$, 91% $Ne^{20}$), which is less expensive than a purified single isotope.

Figure 15:
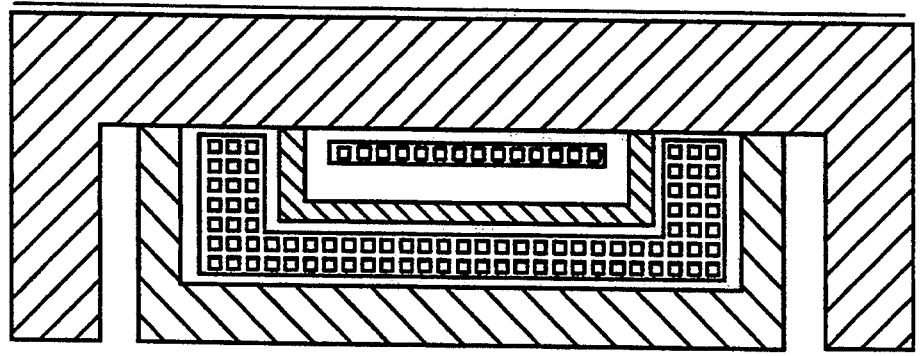
FIG. 15 illustrates a concentric arrangement of a radio frequency discharge coil for exciting the gain medium and an electromagnet and a permanent magnet for biasing the gain medium.
Figure 15:
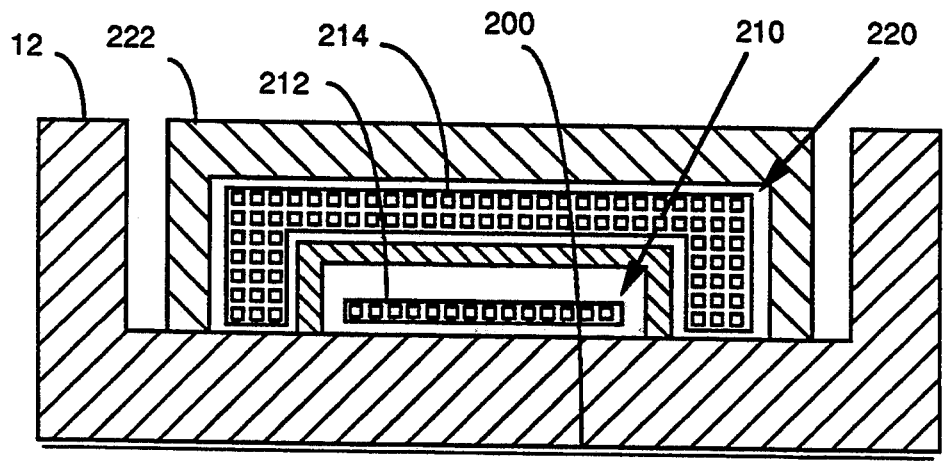

Alternatively as shown in FIG. 15, a radio frequency discharge may be used to excite the gain atoms in gaseous medium. This is achieved by applying an oscillating electromagnetic field, typically at around 100 MHz, to the gain medium by means of an induction coil 210 wound around the gain medium 200 and a suitably tuned oscillatory electronics circuit (not shown). Such techniques are well known in the prior art and are often used to excite commercially available linear gaseous lasers. Application of reference discharges to ring laser gyroscopes was tried in the early days of the ring laser gyroscope technology but encountered problems with inefficient coupling, external noise effects and reaction of the discharge with the glass walls of the gyro frame. Recently improved techniques have been develped for RF discharge excitation of ring lasers.

Radio frequency discharges have several advantages over DC driven discharges for general ring laser gyroscope use. The need for external anodes and cathodes is eliminated and no high voltage supply is required. Because the applied electromagnetic field is alternating in direction, overall gas flow effects within the cavity are minimized, thus eradicating the need for two counterbalancing discharge regions.

Radio frequency discharge techniques have some additional advantages for the split-gain gyro 10 configuration described in this disclosure. First, the exact position of the discharge within the cavity can be controlled externally by suitable placement and length of the induction coil so that gain from the gaseous medium only occurs where the applied axial field is uniform. This is an advantage for the split gain gyro as is described later. Techniques for achieving this goal using a DC discharge are possible, as is also outlined below but involve extra machining of the frame.

Second, use of a radio frequency discharge allows for only one discharge region, and thus a frame for the split-gain gyro may be made with only one cutout for magnets. Having only one magnet cutout reduces the machining for making the frame and may give a significant cost reduction in frame manufacture. Of course, such a split-gain gyro configuration would require operation with dual isotopes of neon to circumvent mode competition problems.

Still referring to FIG. 15, the radio frequency discharge coil 210 is wound around a portion 212 of the frame 12. The radio frequency discharge coil 210 is preferably formed of copper wire and is enclosed in a copper tube 214 that forms a radio frequency resonant cavity. The resonant cavity encloses the portion 200 of the gain medium that is excited by the radio frequency discharge. A plurality of field windings 220 are formed around the copper tube 21 4 and the portion of the frame 12 adjacent the ends of the copper tube 214. A hollow cylindrical permanent magnet 222 is then placed around the field windings 220. The permanent magnet 222 may be formed of a pair of semicylindrical magnets whose ends match together to form a complete cylinder. The permanent magnet 222 provides most of the field required for shifting the gain curves of the gain medium. The field windings 220 receive electric current from a DC driver (not shown) similar to the DC drivers 58 and 59 of FIG. 8. Application of current to the field windings adjusts the magnitude of the axial magnetic field on the gain medium.

Figure 7:
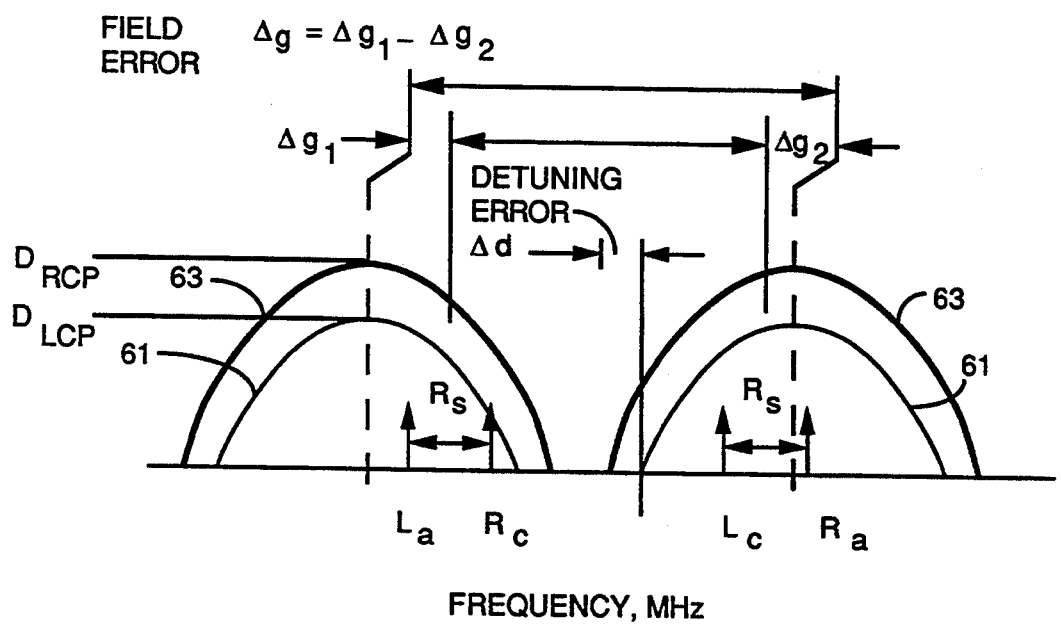
FIG. 7 shows the mode positions and gain curves in the presence of an error $\Delta g$ in the gain curve splitting and an error $\Delta d$ in the preferred detuning position.

Whether the single or dual isotope gas fill is used, the split gain gyro 10 will benefit if the servo system 50 of FIG. 8 maintains the splitting of the two gain curves at substantially the cavity free spectral range. The servo system 50 is preferably driven by a signal that originates from the relative magnitudes of the total clockwise output beam intensity and the total anticlockwise beam intensity. FIG. 7 shows the mode positions and gain curves in the presence of an error $\Delta g$ in the gain curve splitting and an error $\Delta d$ in the preferred detuning position. The curves 61A, 61B, 63A and 63B represent different peak heights for the LCP and RCP modes in accordance the realistic operating characteristics inside a gyro cavity whereby differential polarization losses caused by the presence of non-zero mirror phase retardations create different gain curve heights. Additional effects of differential polarization losses are discussed below. If the gain curves all follow a functional form $f(\nu)$ with frequency, then the mode intensities in the presence of the errors $\Delta g$, $\Delta d$, reciprocal splitting $R_s$ and differential polarization factors $D_{RCP}$ and $D_{LCP}$ can be expressed as:

$$L_a \alpha D_{LCP} f\left(\frac{R_s}{2} + \frac{\Delta g}{2} - \Delta d\right)$$

$$L_c \alpha D_{LCP} f\left(\frac{R_s}{2} - \frac{\Delta g}{2} - \Delta d\right)$$

$$R_c \alpha D_{RCP} f\left(\frac{R_s}{2} - \frac{\Delta g}{2} + \Delta d\right)$$

$$R_a \alpha D_{RCP} f\left(\frac{R_s}{2} + \frac{\Delta g}{2} + \Delta d\right)$$

The resulting total clockwise and anticlockwise intensities are then given by $$L_a + R_a \alpha D_{LCP} f\left(\frac{R_s}{2} + \frac{\Delta g}{2} - \Delta d\right) +$$

$$D_{RCP} f\left(\frac{R_s}{2} + \frac{\Delta g}{2} + \Delta d\right)$$

and $$L_c + R_c \alpha D_{LCP} f\left(\frac{R_s}{2} - \frac{\Delta g}{2} - \Delta d\right) +$$

$$D_{RCP} f\left(\frac{R_s}{2} - \frac{\Delta g}{2} + \Delta d\right).$$

Clearly, regardless of the values of $\Delta d$, $D_{RCP}$ and $D_{LCP}$, these intensities are equal only if the gain curve splitting error $\Delta g$ is zero. Thus a suitable field servo device operating on an error signal derived from the difference in total intensities of the counterpropagating beams is shown in FIG. 8. A more detailed analysis of this servo system, which includes the effects of gain curve saturation produces a result similar to the simplified analysis given above.

Although under ideal operating conditions the split gain gyro 10 is relatively insensitive to cavity length changes, a cavity length servo system is preferable in less than ideal operational circumstances. Such a system can be driven by an error signal derived from the differential intensities of the $L_a$ and $R_c$ modes or the $L_c$ and $R_a$ modes, or an average of the two.

Figure 13:
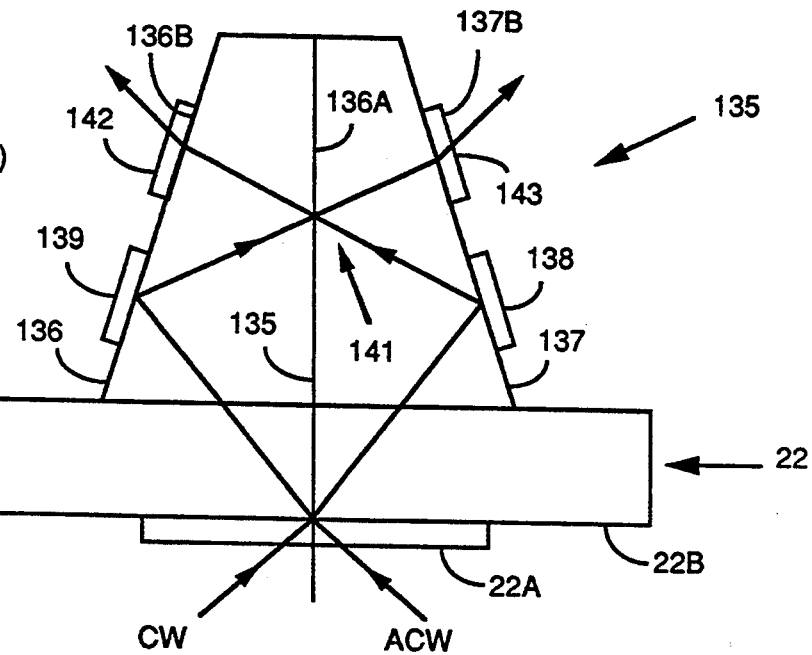
FIG. 13 illustrates a prior art combining optic system that may be used with the invention.

FIG. 13 illustrates a preferred combining optic device for use with the present invention. The light beams indicated by the arrows CW and ACW impinge upon the coating 22A of the mirror 22 and optical signals are extracted from the cavity by partial transmission of the beams through both the coating 22A and the mirror substrate 22B. After propagating through the substrate 22B, the beams then enter an upright prism 135.

The prism 135 is preferably formed in two halves 136 and 137. A 50% beamsplitter 138 is formed on one of the prism halves by coating a suitable dielectric onto a surface 136A of the prism half 136, for example. The two prism halves 136 and 137 are then cemented together so that the beamsplitter 138 is between them.

The extracted portion of the ACW beam impinges on a 100% reflective coating 139 formed on an outer surface 136B. The ACW beam reflects from the coating 139 toward the beamsplitter 138. Similarly, the extracted portion of the CW beam reflects from a 100% reflective coating 140 on the prism half 137 toward the beamsplitter 138. The extracted portions of the CW and CCW beams impinge upon opposite sides of the beamsplitter 138 at a point 141 at the same angles of incidence. The part of the CW beam that is transmitted through the beamsplitter 138 leaves the beamsplitter superposed with the reflected part of the CCW beam. The combined beams then impinge upon an antireflective coating 142 formed on the surface 136B and then propagate to a detector. The part of the CCW beam that is transmitted through the beamsplitter 138 leaves the beamsplitter superposed with the reflected part of the CW beam. The combined beams then impinge upon an antireflective coating 143 formed on the surface 137B and then may also propagate to a detector.

The mode positions shown on the gain curve in FIG. 4B illustrate that at the optimum operating position, the intensity of mode $L_a$ equals that of $R_a$. If a gain curve splitting error exists, then in general, a cavity length control servo system should servo to make the mode sum $L_a+L_c$ equal to that of $R_a+R_c$. Such a system can operate by isolating the various mode intensities at the output mirror using a suitable arrangement of polarizers as disclosed in U.S. Pat. No. 4,225,106, the disclosure of which is hereby incorporated by reference into the present disclosure.

The scheme referenced in the preceding paragraph involves separating the various output beams of the gyro according to polarization state and requires the use of specially coated output mirrors that preserve circular polarization in transmission. Special optical polarizers are attached to and coated onto the gyro combining optics. The output beat of the split gain gyro 10 can be measured by optically combining all four beam outputs and counting the zero crossings of the resulting modulated signal, i.e., demodulating the resulting carrier plus modulation. This method is described in U.S. Pat. No. 4,123,162 to Sanders, the disclosure of which is also incorporated by reference into this disclosure. This technique requires a detector capable of responding to the reciprocal splitting frequency, which is about 100 MHz. Directional information at the output can be obtained by using a pair of spatially separated detectors 70 and 72 as shown in FIG. 8. Suitable adjustment of the output combining optic prism provides two beat signals in quadrature in a manner similar but not identical to such techniques used for two mode dithered ring laser gyroscope components. Alternatively, the beat output information can be obtained by electronically combining the $L_a$, $R_c$ beat with the $L_c$, $R_a$ beat in a manner similar to that disclosed in U.S. Pat. No. 4,225,106 for the conventional multioscillator ring laser gyroscope.

Differential polarization losses in the cavity may cause errors in the split gain gyro 10. Differential polarization losses occur in the cavity when the left and right circularly polarized modes experience different passive cavity losses. Such differential losses are generally present when the cavity mirrors have different reflection coefficients for incident light polarized in the plane of incidence (P-type light) and out of the plane (S-type light) light in addition to having non-zero phase retardance. The phase retardance of a mirror is non-zero when the phase shift difference on reflection for S-type and P-type light is not equal to $\pi$ radians. Typical multilayer dielectric stack mirrors will exhibit both differential losses and non-zero phase retardances. The overall cavity differential polarization losses are easily calculated for a given cavity from individual mirror values for differential losses and phase retardances along with the cavity light path geometry by using the method of Jones matrices. The Jones matrix method is well known in modern optics and described in standard treatises on the subject.

It is desirable to minimize differential polarization losses in the cavity because such losses tend to create elliptical lasing modes in the cavity rather than the desired purely circular modes. Elliptically polarized modes will not see exactly the gain curve profiles of FIG. 6, but will experience cross-coupled gain effects between the split gain curves and addition gain curve peaked about zero frequency splitting. This effectively creates a non-symmetrical overall gain curve which increases sensitivities to detuning, temperature and operating gain. Differential polarization losses in the presence of nonuniform axial magnetic fields can produce increases in temperature and gain sensitivities directly, even with perfectly circularly polarized lasing modes.

Thus it is desirable to minimize the overall cavity differential polarization loss by either manufacturing mirrors with minimal differential losses and phase retardances or by using mirror combinations in the cavity that minimize the overall differential polarization losses.

With suitable care in construction, bias sensitivities arising from differential polarization losses can be minimized. However, the phase retardances in the mirrors may also give rise to residual effects from the dependences of the reciprocal splitting on these retardances. Unlike the two-mode gyro described in U.S. Pat. Application No. 928,069 by the present inventor, the split gain gyro 10 common-mode rejects changes in reciprocal splitting. However, the mirror phase retardances are functions of frequency, and there will be small differences in the reciprocal splitting produced at one longitudinal mode position where the $L_a$ and $R_c$ mode pair operates as opposed to the next longitudinal mode position (differing in frequency by about 1 GHz) where the $L_c$ and $R_a$ pair operate. The result is an overall gyro bias typically of a few tens of Hertz in frequency. This bias may be subject to small temperature changes as the rate of change of mirror phase retardance with respect to temperature differs from one longitudinal mode position to the next. Such effects are minimized as the algebraic sum of the mirror phase retardances in the cavity approach zero, and this should also be considered when choosing cavity mirrors.

Variation in the magnitude of the axial fields as seen by the gain plasma will also cause detuning, temperature and gain sensitivities in the split gain gyro 10. These effects occur because in such cases the excited atoms in the gain medium will see a range of magnetic fields and thus provide gain over a much wider frequency range than provided by the Doppler width alone. The resulting gain curve will be asymmetrical and produce similarly asymmetrical dispersion curves as shown in FIG. 9.

Figure 9:
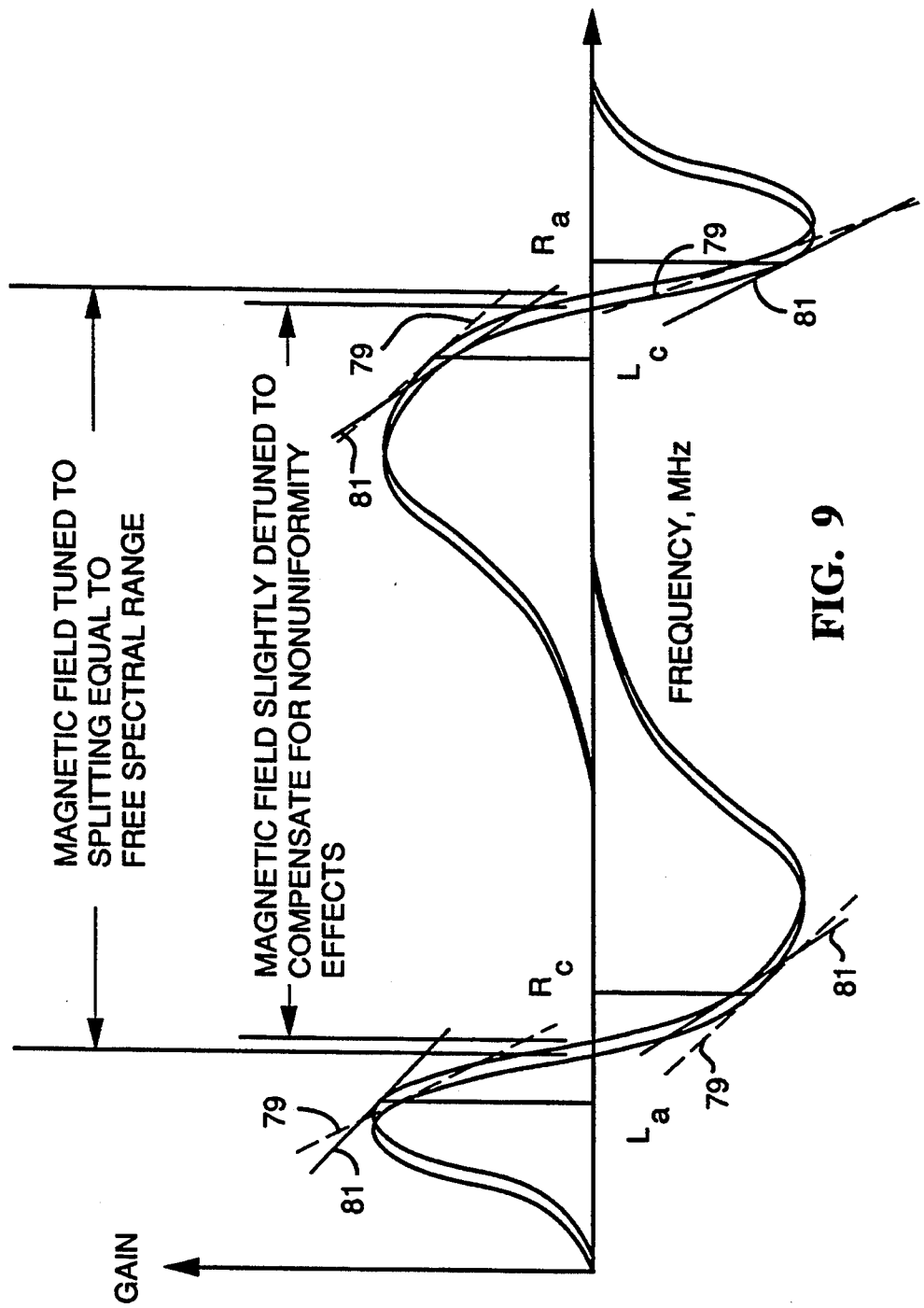
FIG. 9 illustrates the nulling of detuning effects caused by axial field nonuniformity in the split gain ring laser gyroscope.

When the magnetic fields are adjusted so that the gain curve splitting is equal to the cavity free spectral range and the cavity detuning is centered, the dispersion curves are as shown by the lines 79 in FIG. 9. It is clear that the nonuniform axial field introduces a "mirror image" type of symmetry between the curve for the $L_a$, $R_c$ pair and the curve for the $L_c$, $R_a$ pair. The $L_a$ and $L_c$ modes do not lie at points of equal slope on their respective dispersion curves, nor do the $R_c$ and $R_a$ modes. As a result, any change in cavity detuning (the cavity length) will cause different changes in refractive index for the $L_a$ and $L_c$ modes and for the $R_a$ and $R_c$ modes. These differential refractive index changes cause an unwanted change in the gyro bias. This detuning sensitivity can be nulled for reasonable excursions in the cavity length by slightly adjusting the applied axial field so that the gain curve splitting is not quite equal to the free spectral range. This adjustment of the applied field is illustrated by the dispersion curves 81 in FIG. 9. In this case the $L_a$ and $L_c$ modes lie at points of equal slope on their gain curves as do the $R_c$ and $R_a$ modes. Small excursions in the cavity detuning will cause the same changes in refractive index for the $L_a$ and $L_c$ modes (and for the $R_c$ and $R_a$ modes) and thus no overall change in the gyro bias.

This technique for cancelling the cavity detuning sensitivity induced by nonuniform axial fields is similar, but not exactly equivalent, to the plasma dispersion techniques used in conventional split gain ring laser gyroscope designs to minimize detuning sensitivity, as described in U.S. Pat. No. 4,470,701 to Smith. In that case the sensitivity is caused by the Faraday splitting induced by the intracavity element.

Nonuniform axial fields also induce temperature and gain sensitivities in the gyro bias that are not cancelled by the above described technique. Such sensitivities may be minimized by a correct choice of helium-neon gas fill pressure, but it still desirable to minimize the field nonuniformities. Most techniques for creating an axial magnetic field in the gain region of the plasma, whether they be from electromagnetic coils, cylindrical permanent magnets or an arrangement of bar magnets will exhibit end effects where the field falls off drastically or even reverses. Thus it is desirable to limit the gain region to the center region of such magnets. This can be accomplished by using the dependence of the gain in a helium-neon discharge on the gain bore diameter. Theory and experiment show that this dependence is of the form $$g = kLie^{-\alpha d} = \% \text{ gain}$$

where L is the gain length, i is the plasma current, d is the gain bore diameter and k and $\alpha$ are constants. In axial regions where the axial field created by an external magnet is uniform the bore size is narrowed to produce the necessary gain for lasing action. Outside this region the gain bore is enlarged so that very little gain is produced and the magnitude of the axial magnetic field is of no consequence. Practical dimensions can easily achieve an order of magnitude or two reduction in gain for the wide-bore region.

Figure 16:
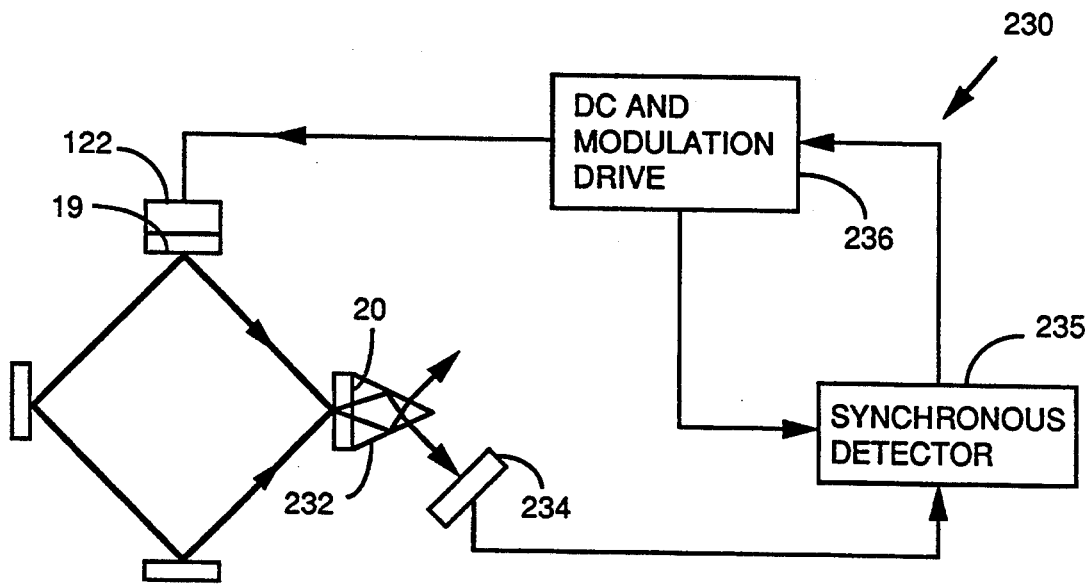
FIG. 16 is a block diagram of a second pathlength control system that may be used in the present invention.

Referring to FIG. 16, a preferred and cost effective alternative cavity length control scheme 230 uses only the single direction or combined beam outputs of the gyro 10 with no polarization sorting requirements. A cavity length modulation is applied to the split gain gyro 10 by means of a piezoelectric actuator 122 as shown in FIG. 11 in a manner that is well-known in the art for two mode gyro cavity length control schemes.

Figure 11:
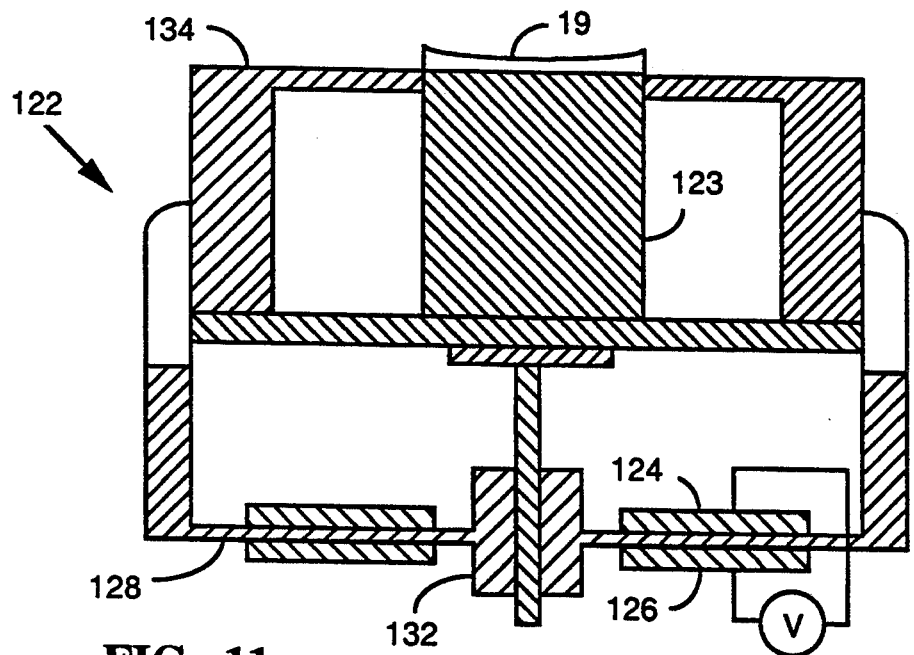
FIG. 11 is a cross sectional view of a diaphragm mirror and mirror actuator apparatus that may be included in ring laser gyroscope of FIG. 8.

FIG. 11 shows a movable mirror and the actuator 122 for moving the mirror to provide cavity length control. The mirror 19, for example, is constrained to translation and is mounted on a post 123. The periphery of the mirror 19 is sufficiently thin that it will flex to permit the center of the mirror to move through a distance adequate to adjust the cavity length to its optimum value. The actuator 122 is mounted to a frame 134 to translate the post 123. Cavity length control is accomplished by applying a voltage to the mirror actuator, which may include a pair of piezoelectric plates 124 and 126 mounted on opposite sides of a thin membrane 128. The voltage causes one of the piezoelectric plates to contract while the other expands, which moves the membrane 128, and consequently the mirror 19, in or out with respect to the cavity 14 of FIG. 14. The structure of the movable mirror 19 and the actuator 122 are described in U.S. Pat. No. 4,383,763 issued May 17, 1983 to Hutchings et al. The disclosure of that patent is hereby incorporated by reference into this disclosure.

Referring to FIG. 16, an upright combining prism 232 may be mounted to the back of the mirror 20, which is partially transmissive. The combining prism 232 forms two output beams that are combinations of the counterpropagating beams in the cavity. The combined output from the gyro 10 may be measured by a standard low frequency photodiode 234. The output of the photodiode 234 is input to synchronous detector 235, whose output is connected to a DC and modulation drive circuit 236. The modulation and drive circuit 236 is connected to the mirror actuator 122 and to the synchronous detector 235. A modulation signal having a known modulation frequency is applied to the mirror actuator 122. The cavity length is adjusted until the modulation frequency component in the photodiode output is minimized. Such a technique has been tested by the present inventor and found to be simple and effective. This method is analogous to cavity length control techniques well known in the art for two mode ring laser gyroscopes although such techniques usually use a single direction output as a servo signal.

Figure 12:
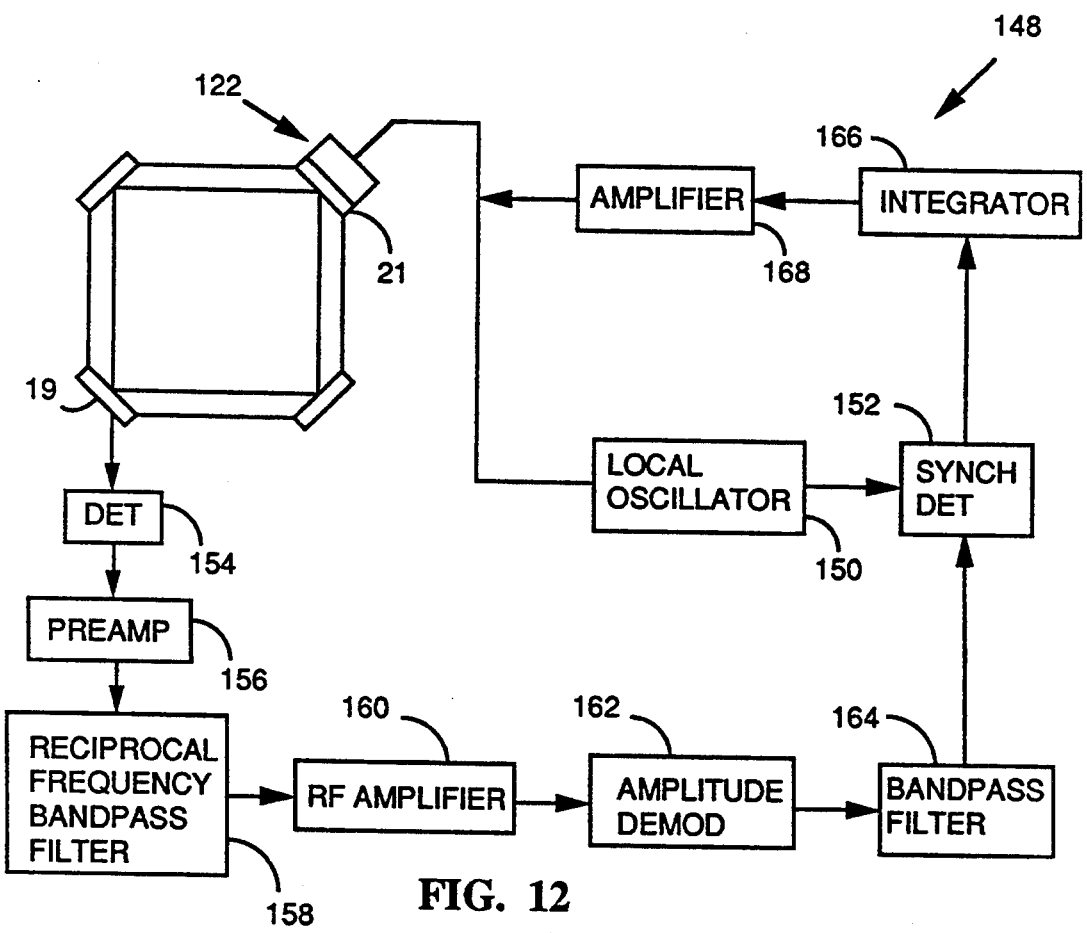
FIG. 12 is a block diagram of a path length control system that may be included in the invention.

An alternative cavity length control technique that works with the split gain gyro 10 is illustrated in FIG. 12. This technique uses a single beam output. This method uses a fast photodiode 154 to examine the amplitude of the beat frequency between the $L_a$ and $R_a$ (or $L_c$ and $R_c$) beam components, typically about 1 GHz. When a modulation is applied to the cavity length as in FIG. 16, the cavity length can be modulated to minimize the component in the fast diode output at the modulation frequency using the same arrangement as shown in FIG. 16. This method differs from the low frequency method in that it may provide a sharper sense signal discriminant, particularly for large cavity reciprocal split times, but does require high speed electronics for operation.

Referring again to FIG. 12, a cavity length control system 148 includes a local oscillator 150 that drives the PZT actuators 124 and 126 of the mirror actuator 122 shown in FIG. 11. The local oscillator 150 and actuator 122 cooperate to dither the mirror 19 with a signal A cos $\omega_m t$, which amplitude and frequency modulates all four beams in the multioscillator ring laser gyroscope. A signal from the photodetector 154 is input to a high frequency preamplifier 156.

The signal output from the photodetector 154 has a component that is the amplitude modulated reciprocal splitting frequency of the beams. The output of the preamplifier 156 is then input to a reciprocal frequency bandpass filter 158, and the filtered signal is then amplified by an RF amplifier 160. After the signal is output from the amplifier 160, it is input to an amplifier demodulator 162.

The amplitude demodulated signal is then input to a low-frequency bandpass amplifier 164, which amplifies and filters the amplitude demodulated signal and then inputs it to a low-frequency synchronous detector 152, which also receives a signal from the local oscillator 150. The output of the synchronous detector 152 is integrated by an integrator 166 and then input to an amplifier 168 which drives the mirror actuator 122. The cavity length control servo system 148 of FIG. 12 locks to maintain the cavity length at the value where rotational acceleration information signal is at its maximum.

Although the invention is described with reference to certain preferred embodiments, these embodiments are exemplary rather than limiting. Modifications to the embodiments described may be made without departing from the invention as defined in the appended claims.

What is claimed is:

1. A Sagnac ring rotation sensor including a resonant cavity that defines a closed optical path and a gain medium therein, comprising:

means for producing four multioscillator lasing modes in the cavity, such that the gain medium provides a corresponding gain curve for each lasing mode;

means for adjusting the gain medium to split each gain curve into two parts separated in frequency; and means for positioning a pair of consecutive longitudinal mode sets, each set including the four multioscillator lasing modes, relative to the two parts of the gain curve such that only two modes from each of the two mode sets are allowed to lase.

2. The Sagnac ring rotation sensor of claim 1 including means for separating the lasing frequencies of lasing modes of different polarization.

3. The Sagnac ring rotation sensor of claim 1 wherein the adjusting means comprises means for applying an axially directed magnetic field to the gain medium.

4. The Sagnac ring rotation sensor of claim 3 wherein the cavity has a free spectral range, further including means for adjusting the axial magnetic field to a magnitude that produces a splitting between the gain curve for anticlockwise left circularly polarized light and clockwise right circularly polarized light and the gain curve for clockwise left circularly polarized light and anticlockwise right circularly polarized light that is substantially equal in frequency to a multiple of the free spectral range of the cavity.

5. The Sagnac ring rotation sensor of claim 4 wherein the cavity length is tuned to a length where a first part of the gain curve of a selected mode is centered about a first longitudinal cavity mode set and a second part of the gain curve is centered about a second longitudinal mode set different from the first longitudinal mode set.

6. The Sagnac ring rotation sensor of claim 1 wherein the suppression of the selected lasing modes prevents the occurrence of frequency locking in the cavity.

7. The Sagnac ring rotation sensor of claim 6 wherein the gain medium comprises a mixture of gases.

8. The Sagnac ring rotation sensor of claim 6 wherein the gain medium comprises a naturally occurring mixture of $Ne^{22}$ and $Ne^{20}$.

9. The Sagnac ring rotation sensor of claim 6 wherein the gain medium comprises a purified mixture of about 50% $Ne^{22}$ and 50% $Ne^{20}$.

10. The Sagnac ring rotation sensor of claim 1 wherein the adjusting means comprises means for applying an axially directed magnetic field to the gain medium.

11. The Sagnac ring rotation sensor of claim 10, further comprising means for providing that the lasing modes are substantially circularly polarized in the gain medium where the axially directed magnetic field is applied.

12. The Sagnac ring rotation sensor of claim 1 further including means for changing the length of the cavity by an amount on the order of the wavelength of the lasing light in the cavity.

13. The Sagnac ring rotation sensor of claim 1 including means for controlling the length of the cavity to suppress the selected lasing modes.

14. The Sagnac ring rotation sensor of claim 1 wherein the cavity supports four lasing modes such that waves of two different polarizations propagate in each direction in the cavity.

15. The Sagnac ring rotation sensor of claim 14 wherein the cavity has a free spectral range, further including means for adjusting the axial magnetic field to a magnitude that produces a splitting between the gain curve for anticlockwise left circularly polarized light and clockwise right circularly polarized light and the gain curve for clockwise left circularly polarized light and anticlockwise right circularly polarized light that is substantially equal in frequency to a multiple of the free spectral range of the cavity.

16. The Sagnac ring rotation sensor of claim 15 wherein the cavity length is tuned to a length where a first part of the gain curve of a selected mode is centered about a first longitudinal cavity mode set and a second part of the gain curve is centered about a second longitudinal mode set different from the first longitudinal mode set.

17. The Sagnac ring rotation sensor of claim 12 wherein the cavity has a free spectral range, further including means for adjusting the axial magnetic field to a magnitude that produces a splitting between the gain curve for anticlockwise left circularly polarized light and clockwise right circularly polarized light and the gain curve for clockwise left circularly polarized light and anticlockwise right circularly polarized light that is substantially equal in frequency to a multiple of the free spectral range of the cavity.

18. The Sagnac ring rotation sensor of claim 17 wherein the cavity length is tuned to a length where a first part of the gain curve of a selected mode is centered about a first longitudinal cavity mode set and a second part of the gain curve is centered about a second longitudinal mode set different from the first longitudinal mode set.

19. The Sagnac ring rotation sensor of claim 18 wherein the first and second longitudinal mode sets are adjacent in frequency.

20. The Sagnac ring rotation sensor of claim 19 including means for adjusting the axial magnetic field on the gain medium and means for adjusting the cavity length such that four modes lase in the cavity, the four modes being arranged in two longitudinal mode sets such that lasing modes of opposite polarization in each set propagate in opposite directions in the cavity.

21. The Sagnac ring rotation sensor of claim 20 wherein the cavity includes four mirrors arranged to direct the beams along the optical path.

22. The Sagnac ring rotation sensor of claim 21 wherein the cavity forms a non-planar optical path that sustains substantially circularly polarized eigenmodes having a reciprocal separation in resonating frequency by an amount controlled by the cavity geometry.

23. The Sagnac ring rotation sensor of claim 22 wherein the cavity lases with an anticlockwise left circularly polarized wave, a clockwise right circularly polarized wave, a clockwise left circularly polarized wave and an anticlockwise right circularly polarized wave.

24. A Sagnac ring rotation sensor including a resonant cavity that defines a closed optical path and a gain medium therein, comprising:

means for producing multioscillator lasing modes in the cavity such that the gain medium provides a corresponding gain curve for each lasing mode;

means for applying a first axial magnetic field of a first magnitude to a first region of the gain medium;

means for applying a second axial magnetic field of a second magnitude different from the first magnitude to a second region of the gain medium, the first and second axial magnetic fields cooperating to split each gain curve into two parts separated in frequency; and means for positioning a pair of consecutive longitudinal mode sets, each set including the four multioscillator lasing modes, relative to the two parts of the gain curve such that only two modes from each Of the two mode sets are allowed to lase.

25. The Sagnac ring rotation sensor of claim 24 wherein the first and second gain regions cooperate to to produce two gain curves for the polarization eigenmodes of the cavity, the eigenmodes being separated by multiples of the cavity free spectral range.

26. The Sagnac ring rotation sensor of claim 25 wherein the first and second magnetic fields and the first and second regions of the gain medium cooperate to allow simultaneous stable lasing of counterpropagating modes without mode competition for the same excited particles of the gain medium.

27. The Sagnac ring rotation sensor of claim 24 including means for providing uniformity in the axial magnetic fields in the regions of the gain medium where gain is provided for lasing within the gain medium.

28. The Sagnac ring rotation sensor of claim 24 where the cavity has a larger cross sectional area in the gain regions than at the non-gain regions.

29. The Sagnac ring rotation sensor of claim 24 wherein a permanent magnet provides the major part of the magnetic field, further including means for making small adjustments to the field.

30. The Sagnac ring rotation sensor of claim 29 wherein the means for adjusting the field comprises:
a field coil having a plurality of windings; and
means for energizing the field coil to provide a selected magnetic field to the gain medium.

31. The Sagnac ring rotation sensor of claim 30 wherein the field coil is formed to provide an axial field of high uniformity to the gain medium.

32. The Sagnac ring rotation sensor of claim 30 wherein at least one permanent bar magnet is positioned essentially parallel to the gain medium to provide a magnetic field to the gain medium.

33. The Sagnac ring rotation sensor of claim 32 wherein a field coil winding is wound around the bar magnet to provide means for adjusting the magnetic field.

34. The Sagnac ring rotation sensor of claim 24 including means for servoing the applied axial magnetic fields to values where the gain curve splitting equals a multiple of the cavity free spectral range.

35. The Sagnac ring rotation sensor of claim 34 wherein the servoing means includes:
means for monitoring the total clockwise and anticlockwise beam intensities; and
means for controlling the difference between the clockwise and counterclockwise beam intensities.

36. The Sagnac ring rotation sensor of claim 24 wherein means for producing a radio frequency discharge is used to excite the gain medium.

37. The Sagnac ring rotation sensor of claim 36 wherein the cavity is formed in a frame having a portion removed therefrom to form a cutout around the gain medium, the radio frequency discharge producing means, the permanent magnet and the field windings being arranged coaxially in the cutout to provide gain excitation and axial fields in the gain medium.

38. The Sagnac ring rotation sensor of claim 37, further including means for adjusting the cavity mirror phase retardances to minimize differential polarization losses in the cavity.

39. A method for sensing rotations with a Sagnac ring rotation sensor that includes a resonant cavity that defines a closed optical path and a gain medium therein, comprising the steps of:
producing four multioscillator lasing modes in the cavity, the gain medium providing a corresponding gain curve for each lasing mode;
adjusting the gain medium to split each gain curve into two parts separated in frequency; and
positioning a pair of consecutive longitudinal mode sets, each set including the four multioscillator lasing modes, relative to the two parts of the gain curve such that only two modes from each of the two mode sets are allowed to lase.

40. The method of claim 39 including the step of separating the lasing frequencies of lasing modes of different polarization.

41. The method of claim 39 wherein adjusting the gain medium to produce a frequency shift between selected gain curves includes the step of applying an axially directed magnetic field to the gain medium.

42. The method of claim 41 wherein the cavity has a free spectral range, further including the step of adjusting the axial magnetic field to a magnitude that produces a splitting between the gain curve for anticlockwise left circularly polarized light and clockwise right circularly polarized light and the gain curve for clockwise left circularly polarized light and anticlockwise right circularly polarized light that is substantially equal in frequency to a multiple of the free spectral range of the cavity.

43. The method of claim 42 including the step of tuning the cavity length to a length where a first part of the gain curve of a selected mode is centered about a first longitudinal cavity mode set and a second part of the gain curve is centered about a second longitudinal mode set different from the first longitudinal mode set.

44. The method of claim 39 including the step of preventing the occurrence of frequency locking in the cavity by suppressing the selected lasing modes.

45. The method of claim 44 including the step of forming the gain medium to comprise a mixture of gases.

46. The method of claim 44 including the step of forming the gain medium to comprise a naturally occurring mixture of $Ne^{22}$ and $Ne^{20}$.

47. The method of claim 44 including the step of forming the gain medium to comprise a purified mixture of about 47% $Ne^{22}$ and 47% $Ne^{20}$.

48. The method of claim 39 wherein adjusting means comprise the step of applying an axially directed magnetic field to the gain medium.

49. The method of claim 48, further comprising the step of providing substantially circularly polarized lasing modes in the gain medium where the axially directed magnetic field is applied.

50. The method of claim 39 including the step of controlling the length of the cavity to suppress the selected lasing modes.

51. The method of claim 39 wherein the cavity has a free spectral range, further including the step of adjusting the axial magnetic field to a magnitude that produces a splitting between the gain curve for anticlockwise left circularly polarized light and clockwise right circularly polarized light and the gain curve for clockwise left circularly polarized light and anticlockwise right circularly polarized light that is substantially equal in frequency to a multiple of the free spectral range of the cavity.

52. The method of claim 51 including the step of tuning the cavity length to a length where a first part of the gain curve of a selected mode is centered about a first longitudinal cavity mode set and a second part of the gain curve is centered about a second longitudinal mode set different from the first longitudinal mode set.

53. The method of claim 49 wherein the cavity has a free spectral range, further including the step of adjusting the axial magnetic field to a magnitude that produces a splitting between the gain curve for anticlockwise left circularly polarized light and clockwise right circularly polarized light and the gain curve for clockwise left circularly polarized light and anticlockwise right circularly polarized light that is substantially equal in frequency to a multiple of the free spectral range of the cavity.

54. The method of claim 53 including the step of tuning the cavity length to a length where a first part of the gain curve of a selected mode is centered about a first longitudinal cavity mode set and a second part of the gain curve is centered about a second longitudinal mode set different from the first longitudinal mode set.

55. The method of claim 54 including the step of tuning the cavity such that the first and second longitudinal mode sets are adjacent in frequency.

56. The method of claim 55 including the step of adjusting the axial magnetic field on the gain medium and the step of adjusting the cavity length such that four modes lase in the cavity, the four modes being arranged in two longitudinal mode sets such that lasing modes of opposite polarization in each set propagate in opposite directions in the cavity.

57. The method of claim 56 including the step of forming the cavity to include four mirrors arranged to direct the beams along the optical path.

58. The method of claim 57 including the step of forming a nonplanar optical path in the cavity that sustains substantially circularly polarized eigenmodes having a reciprocal separation in resonating frequency by an amount controlled by the cavity geometry.

59. The method of claim 58 including the step of providing in the cavity an anticlockwise left circularly polarized wave, a clockwise right circularly polarized wave, a clockwise left circularly polarized wave and an anticlockwise right circularly polarized wave.

60. A method for sensing rotations with a Sagnac ring rotation sensor that includes a resonant cavity that defines a closed optical path and a gain medium therein, comprising the steps of:
  producing multioscillator lasing modes in the cavity, the gain medium providing a corresponding gain curve for each lasing mode;
  applying a first axial magnetic field of a first magnitude to a first region of the gain medium;
  applying a second axial magnetic field of a second magnitude different from the first magnitude to a second region of the gain medium, the first and second axial magnetic fields cooperating to split each gain curve into two parts separated in frequency; and
  positioning a pair of consecutive longitudinal mode sets, each set including the four multioscillator lasing modes, relative to the two parts of the gain curve such that only two modes from each of the two mode sets are allowed to lase.

61. The method of claim 60 including the step of forming the first and second gain regions cooperate to to produce two gain curves for the polarization eigenmodes of the cavity, the eigenmodes being separated by multiples of the cavity free spectral range.

62. The method of claim 61 including the step of applying the first and second magnetic fields and the first and second regions of the gain medium cooperate to allow simultaneous stable lasing of counterpropagating modes without mode competition for the same excited particles of the gain medium.

63. The method of claim 60 including the step of providing uniformity in the axial magnetic fields in the regions of the gain medium where gain is provided for lasing within the gain medium.

64. The method of claim 60 including the step of forming the cavity to have a larger cross sectional area in the gain regions than at the non-gain regions.

65. The method of claim 60 including the steps of providing the major part of the magnetic field with a permanent magnet and adjusting to the field with an electromagnet.

66. The method of claim 65 wherein the step adjusting the field comprises the steps of:
  placing a field coil having a plurality of windings around the gain medium; and
  energizing the field coil to provide a selected magnetic field to the gain medium.

67. The method of claim 66 including the steps of forming the field coil to provide an axial field of high uniformity to the gain medium.

68. The method of claim 66 including the steps of placing at least one permanent bar magnet essentially parallel to the gain medium to provide a magnetic field to the gain medium.

69. The method of claim 68 including the steps of winding a field coil around the bar magnet to provide means for adjusting the magnetic field.

70. The method of claim 60 including the step of servoing the applied axial magnetic fields to values where the gain curve splitting equals a multiple of the cavity free spectral range.

71. The method of claim 70 wherein the steps of the servoing the applied axial magnetic fields includes the steps of:
  monitoring the total clockwise and anticlockwise beam intensities; and
  controlling the difference between the clockwise and counterclockwise beam intensities.

72. The method of claim 60 including the step of exciting the gain medium with a radio frequency discharge.

73. The method of claim 72 including the steps:
  forming the cavity in a frame;
  removing a portion of the frame to form a cutout around the gain medium; and
  arranging the radio frequency discharge producing means, the permanent magnet and the field windings coaxially in the cutout to providing gain excitation and axial fields in the gain medium.

74. The method of claim 73, further including the step of adjusting the cavity mirror phase retardances to minimize differential polarization losses in the cavity.

* * * * *